United States Patent
Wang et al.

(10) Patent No.: US 9,455,469 B2
(45) Date of Patent: Sep. 27, 2016

(54) RECHARGEABLE MAGNESIUM-ION CELL HAVING A HIGH-CAPACITY CATHODE

(75) Inventors: Yanbo Wang, Fairborn, OH (US);
Aruna Zhamu, Centerville, OH (US);
Bor Z. Jang, Dayton, OH (US)

(73) Assignee: Nanotek Instruments, Inc., Dayton, OH (US)

(*) Notice: Subject to any disclaimer, the term of this patent is extended or adjusted under 35 U.S.C. 154(b) by 619 days.

(21) Appl. No.: 13/506,736

(22) Filed: May 14, 2012

(65) Prior Publication Data
US 2013/0302697 A1    Nov. 14, 2013

(51) Int. Cl.
| | |
|---|---|
| H01M 10/054 | (2010.01) |
| H01M 4/485 | (2010.01) |
| H01M 4/587 | (2010.01) |
| B82Y 30/00 | (2011.01) |
| H01G 11/36 | (2013.01) |
| H01G 11/56 | (2013.01) |
| H01M 4/04 | (2006.01) |
| H01M 4/58 | (2010.01) |
| H01M 4/46 | (2006.01) |
| H01M 10/44 | (2006.01) |

(52) U.S. Cl.
CPC ............ *H01M 10/054* (2013.01); *B82Y 30/00* (2013.01); *H01G 11/36* (2013.01); *H01G 11/56* (2013.01); *H01M 4/0445* (2013.01); *H01M 4/466* (2013.01); *H01M 4/485* (2013.01); *H01M 4/587* (2013.01); *H01M 4/5815* (2013.01); *H01M 4/5825* (2013.01); *H01M 10/446* (2013.01); *Y02E 60/122* (2013.01); *Y02E 60/13* (2013.01)

(58) Field of Classification Search
CPC ........... H01M 10/054; H01M 4/0445; H01M 4/485; H01M 4/5815; H01M 4/5825; H01M 4/587; H01M 4/466; H01M 10/446
See application file for complete search history.

(56) References Cited

U.S. PATENT DOCUMENTS

| | | | |
|---|---|---|---|
| 4,400,453 A * | 8/1983 | Blomgren et al. ............ 429/325 |
| 2008/0182176 A1 | 7/2008 | Ayrbach et al. | |
| 2010/0216027 A1* | 8/2010 | Fujii ................... H01G 9/016 |
| | | | 429/246 |
| 2011/0159381 A1 | 6/2011 | Doe et al. | |
| 2012/0171574 A1* | 7/2012 | Zhamu et al. ................ 429/300 |
| 2012/0295166 A1* | 11/2012 | Gennett et al. ............... 429/314 |
| 2013/0129914 A1* | 5/2013 | Nagayama et al. ............ 427/58 |
| 2014/0106214 A1* | 4/2014 | Doe et al. ..................... 429/188 |

OTHER PUBLICATIONS

E. Levi, et al., "On the Way to Rechargeable Mg Batteries: The Challenge of New Cathode Materials," Chemistry of Materials, 22 (2010) 860-868.

(Continued)

*Primary Examiner* — Barbara Gilliam
*Assistant Examiner* — Angela Martin

(57) ABSTRACT

A magnesium-ion cell comprising (a) a cathode comprising a carbon or graphitic material as a cathode active material having a surface area to capture and store magnesium thereon, wherein the cathode forms a meso-porous structure having a pore size from 2 nm to 50 nm and a specific surface area greater than 50 m$^2$/g; (b) an anode comprising an anode current collector alone or a combination of an anode current collector and an anode active material; (c) a porous separator disposed between the anode and the cathode; (d) electrolyte in ionic contact with the anode and the cathode; and (e) a magnesium ion source disposed in the anode to obtain an open circuit voltage (OCV) from 0.5 volts to 3.5 volts when the cell is made.

29 Claims, 11 Drawing Sheets

(56) References Cited

OTHER PUBLICATIONS

Y. NuLi, et al. "Electrochem Intercalation of Mg2+ in Mg Manganese Silicate and its App. as High-Energy Rechargeable Mg Battery Cathode," J. Phy. Chem. C113(2009) 12594-97.

J. Muldoon, et al., "Electrolyte roadblocks to a magnesium rechargeable battery," Energy & Environ. Sci., 5 (2012) 5941-5950.
J. Giraudet, et al., "Magnesium Batteries: Toward a First Use of Graphite Fluorides," Journal of Power Sources, 173 (2007) 592-598.

* cited by examiner

RECHARGEABLE MAGNESIUM-ION CELL HAVING A HIGH-CAPACITY CATHODE

FIELD OF THE INVENTION

This invention relates generally to the field of rechargeable magnesium battery and, more particularly, to a magnesium-ion cell having a meso-porous graphitic material-based high-capacity cathode.

BACKGROUND OF THE INVENTION

For over three decades, battery scientists have been frustrated with the low energy density of lithium-ion cells primarily due to the low lithium-storing capacity of all existing cathode active materials. Specifically, the practical specific capacity achievable with current cathode materials has been limited to the range of 150-250 mAh/g (mostly less than 200 mAh/g), leading to an energy density (specific energy) of 120-180 Wh/kg.

Presumably rechargeable lithium metal batteries featuring a lithium metal anode can exhibit a higher energy density (e.g. up to 250 Wh/kg for a polymer electrolyte Li cell), but lithium metal anode suffers from the severe dendrite problem, which has been a major safety issue in battery industry for more than 3 decades. In order to overcome this dendrite issue, most of the commercially available Li-ion cells make use of a carbon- or graphite-based material as an anode active material to replace bare Li metal foil. However, these carbon or graphite anode materials have several significant drawbacks: low specific capacity (theoretical capacity of only 372 mAh/g of graphite), slow Li intercalation (due to low solid-state diffusion coefficients of Li in graphite) resulting in a long recharge time, inability to deliver high pulse power, and necessity to use lithiated cathodes (e.g. lithium cobalt oxide), thereby limiting the choice of available cathode materials. Furthermore, these commonly used cathodes also rely upon extremely slow Li diffusion in the solid state. These factors have contributed to the two major shortcomings of today's Li-ion batteries—a low energy density (typically 120-180 Wh/$kg_{cell}$) and low power density (~0.5 kW/$kg_{cell}$). It may be further noted that Li-sulfur and Li-air can exhibit a higher energy density, but the power density is even lower than that of Li-ion cells.

Hence, there has been strong and continued demand for batteries capable of storing more energy (Wh/l or Wh/kg) and delivering more power (W/kg or W/l) than current rechargeable Li-ion batteries. One possible route to meeting this demand is to utilize divalent magnesium ion ($Mg^{2+}$), rather than the monovalent cation lithium ($Li^+$) because magnesium enables nearly twice as much charge to be transferred, per weight or volume, as $Li^+$ thus enabling high energy density. Further, magnesium metal and Mg-containing alloys or compounds are more abundant and readily available, potentially enabling significant cost reduction relative to Li-ion batteries. Unfortunately, in general, the cathode active materials capable of storing Mg ions exhibit even lower specific capacity (typically <200 mAh/g and more typically <150 mAh/g) as compared to the current cathode active materials for lithium-ion cells.

The cathode active materials proposed for use in a Mg-ion cell include: Chevrel phase $Mo_6S_8$, $MnO_2$, CuS, $Cu_2S$, $Ag_2S$, $CrS_2$, and $VOPO_4$; layered compounds $TiS_2$, $V_2O_5$, $MgVO_3$, $MoS_2$, $MgV_2O_5$, and $MoO_3$; Spinel structured compounds $CuCr_2S_4$, $MgCr_2S_4$, $MgMn_2O_4$, and $Mg_2MnO_4$; NASICON structured compounds $MgFe_2(PO_4)_3$ and $MgV_2(PO_4)_3$; Olivine structured compounds $MgMnSiO_4$ and $MgFe_2(PO_4)_2$; Tavorite structured compound $Mg_{0.5}VPO_4F$; pyrophosphates $TiP_2O_7$ and $VP_2O_7$; and $FeF_3$. For a review on the state-of-the-art of rechargeable Mg batteries, one may consult the following references:

(1) E. Levi, et al., "On the Way to Rechargeable Mg Batteries: The Challenge of New Cathode Materials," Chemistry of Materials, 22 (2010) 860-868. (This reference provides a brief review on cathode active materials for rechargeable Mg cells.)

(2) Y. NuLi, et al. "Electrochemical Intercalation of $Mg^{2+}$ in Magnesium Manganese Silicate and its Application as High-Energy Rechargeable Magnesium Battery Cathode," J. Physical Chem., C. 113 (2009) 12594-97. (This reference provides an intercalation compound as a cathode active material.)

(3) J. Muldoon, et al., "Electrolyte roadblocks to a magnesium rechargeable battery," Energy & Environ. Sci., 5 (2012) 5941-5950. (This reference provides perspectives on electrolyte-related issues of Mg cells.)

(4) D. Aurbach, et al., "Rechargeable Magnesium Batteries," US Pub. No. 2008/0182176, Jul. 31, 2008. (This reference discloses a Chevrel phase intercalation compound as a cathode active material.)

(5) R. E. Doe, et al., "Rechargeable Magnesium-ion Cell Component and Assembly," US Pub. No. 2011/0159381, Jun. 30, 2011. (This reference reported that glassy carbon, graphite foil, and graphite fibers have a high anodic stability limit and, hence, suggested the use of these materials as a current collector, not as an anode active material or cathode active material. The anode active material used was Mg metal (hence, this reference really teaches about a Mg cell, not Mg-ion cell) and there was no teaching about an anode active material. The cathode active materials suggested in this reference were those prior art intercalation compounds, such as Chevrel phase and spinel compounds.)

The current cathode active materials proposed for use in rechargeable Mg batteries and the current Mg batteries as a device or as an industry sector have the following serious drawbacks:

(1) The practical capacity achievable with current cathode materials has been mostly lower than 300 mAh/g and more often less than 150 mAh/g.

(2) The production of these cathode active materials normally has to go through a high-temperature sintering procedure for a long duration of time, a tedious, energy-intensive, and difficult-to-control process.

(3) The insertion and extraction of magnesium ions in and out of these commonly used cathodes rely upon extremely slow solid-state diffusion of Li in solid particles having very low diffusion coefficients, leading to a very low power density (another serious problem of today's Mg-ion batteries).

(4) The current cathode materials are electrically and thermally insulating, not capable of effectively and efficiently transporting electrons and heat. The low electrical conductivity means high internal resistance and the necessity to add a large amount of conductive additives, effectively reducing the proportion of electrochemically active material in the cathode that already has a low capacity. The low thermal conductivity also implies a higher tendency to undergo thermal runaway, a major safety issue in lithium or magnesium battery industry.

(5) Most of these cathodes contain a high oxygen content that could assist in accelerating the thermal runaway and provide oxygen for electrolyte oxidation, increasing the danger of explosion or fire hazard. This is a serious problem that has hampered the widespread implementation of lithium-ion batteries in electric vehicles (EVs). If not properly addressed, this problem will also impede the use of Mg-ion batteries in EVs.

(6) A potentially good cathode active material disclosed in open literature is graphite fluoride (GF) [e.g., J. Giraudet, et al., "Magnesium Batteries: Toward a First Use of Graphite Fluorides," Journal of Power Sources, 173 (2007) 592-598]. The GF, used as a cathode active material, exhibits a specific magnesium storage capacity C of up to 572 mAh/g based on the cathode active material weight. With a medium operating voltage $V_{1/2}$ of 1.08 volts, the maximum specific energy (also based on the cathode active material weight) is $E_s = C^*V_{1/2} = 618$ Wh/kg (Table 1 of Giraudet, et al). This is approximately equivalent to a cell-level specific energy of $618/5 = 124$ Wh/$kg_{cell}$, which is lower than those (120-180 Wh/$kg_{cell}$) of most of the current Li-ion cells. Further significantly, the best specific power of these Mg-ion cells featuring a GF cathode is only 10.8-12.0 W/$kg_{cathode}$ or 2.2-2.4 W/$kg_{cell}$, which is 2-3 orders of magnitude lower than the specific power of current Li-ion cells. The batteries for various EVs demand a specific power significantly higher than 1,000 W/$kg_{cell}$. Clearly, as of now, even the best Mg-ion cells fall short of the performance requirements of EV batteries by a huge margin.

(7) There are only an extremely limited number of electrolytes known to be potentially suitable for use in a rechargeable Mg cell; none of them are commercially available. This has been the most severe impediment to the practical use or commercialization of rechargeable Mg batteries. Most of the presumably good candidate electrolytes induce a thick and dense passivating layer on the Mg metal at the anode. This passivating layer is impermeable to Mg ions and electronically insulating, effectively preventing Mg dissolution (during cell discharge) and Mg ion re-deposition (during cell recharge).

Hence, it is an object of the present invention to provide a high-capacity cathode active material (preferably with a specific capacity greater than 250 mAh/g) for use in a magnesium-ion cell.

It is another object of the present invention to provide a high-capacity Mg-ion cell featuring a cathode active material that exhibits a specific capacity greater than 300 mAh/g, preferably greater than 600 mAh/g, or more preferably greater than 800 mAh/g, leading to a cell-level specific energy greater than 250 Wh/$kg_{cell}$, typically greater than 300 Wh/$kg_{cell}$, or even greater than 600 Wh/$kg_{cell}$.

It is still another object of the present invention to provide a Mg-ion cell having a high-capacity cathode active material (with a specific capacity significantly greater than 250 mAh/g) that can be readily prepared without going through an energy-intensive sintering process.

Another object of the present invention is to provide a high-capacity cathode active material (with a specific capacity greater than 250 mAh/g) that is capable of storing magnesium atoms without the need to undergo magnesium intercalation, thereby leading to a significantly improved power density and reduced recharge time.

Yet another object of the present invention is to provide a high-capacity cathode active material that is electrically and thermally conductive, enabling high-rate capability and effective heat dissipation in a Mg-ion cell.

It is still another object of the present invention to provide a high-capacity cathode active material that contains little or no oxygen, reducing or eliminating the potential fire hazard or explosion.

It is a further objective of the present invention to provide Mg-ion cells that can operate on a much wide scope of electrolytes.

It is an ultimate object of the present invention to provide a high energy density and high power density magnesium-ion cell featuring a high-capacity cathode active material that does not operate on magnesium intercalation, is intrinsically conductive (both thermally and electrically), contains little or no oxygen, can be fabricated cost-effectively and without consuming lots of energy, and exhibit a specific capacity significantly greater than 300 mAh/g.

SUMMARY OF THE INVENTION

The present invention provides a magnesium-ion cell comprising:

(a) a positive electrode (cathode) comprising a carbon or graphitic material as a cathode active material having a surface area to capture and store magnesium thereon, wherein said cathode forms a porous structure having a pore size in the range from 1 nm to 100 nm (preferably a meso-porous structure having a pore size in the range of 2-50 nm) and a specific surface area greater than 50 m$^2$/g (preferably >100 m$^2$/g, further preferably >500 m$^2$/g, further preferably >1,000 m$^2$/g, and most preferably >1, 500 m$^2$/g; these surfaces are accessible to the electrolyte and are in direct contact with the electrolyte);

(b) a negative electrode (anode) comprising an anode current collector alone or a combination of an anode current collector and an anode active material;

(c) a porous separator disposed between the anode and the cathode;

(d) an electrolyte in ionic contact with the anode and the cathode; and (e) a magnesium ion source disposed in said anode to obtain an open circuit voltage (OCV) from 0.5 volts to 3.5 volts (more often 1.0 to 2.5 volts) when the cell is made.

The magnesium ion source may be selected from a magnesium chip, magnesium alloy chip, magnesium foil, magnesium alloy foil, magnesium powder, magnesium alloy powder, magnesium particles, magnesium fibers or rods, magnesium or magnesium alloy film coated on a surface of an anode material or current collector, or a combination thereof.

The carbon or graphitic material in the cathode may be selected from graphene sheets, graphite worms, exfoliated graphite flakes, expanded graphite, chemically treated carbon (e.g. expanded carbon nanotubes) or graphite with an inter-graphene planar separation no less than 0.4 nm (this $d_{002}$ spacing may be determined from X-ray diffraction), chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically expanded carbon nano-fiber, or a combination thereof. The conventional graphitic material having a graphite crystal therein normally has a $d_{002}$ spacing of approximately 0.3359-0.37 nm, not conducive to accommodating metal ions larger than Li$^+$.

The carbon or graphitic material in the cathode preferably contains a single-layer sheet or multi-layer platelet of graphene, graphene oxide, graphene fluoride, hydrogenated graphene, nitrogenated graphene, pristine graphene, doped graphene, boron doped graphene, nitrogen doped graphene, chemically treated graphene, reduced graphene oxide, functionalized graphene or graphene oxide, or a combination thereof. Alternatively, the carbon or graphitic material in the cathode may contain a single-wall carbon nanotube or multi-wall carbon nanotube.

In such a new Mg-ion cell, the cathode active material typically has a specific capacity greater than 300 mAh/g, often greater than 500 mAh/g, even greater than 1,000 mAh/g, and in some cases greater than 1,500 mAh/g. These specific capacity values are unprecedented for Mg-ion cells and largely unachievable with conventional cathodes in Li-ion cells as well.

The cathode in this new Mg-ion cell may further contain a conductive filler selected from graphite or carbon particles, carbon black, expanded graphite particles, carbon nanotube, carbon nano-fiber, carbon fiber, conductive polymer, or a combination thereof. The cell may further comprise a cathode current collector wherein the cathode current collector or the anode current collector is a porous, electrically conductive material selected from metal foam, carbon-coated metal foam, metal web or screen, carbon-coated metal web or screen, perforated metal sheet, carbon-coated porous metal sheet, metal fiber mat, carbon-coated metal-fiber mat, metal nanowire mat, porous conductive polymer film, conductive polymer nano-fiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nano-tube paper, or a combination thereof.

The cathode current collector or the anode current collector may be a carbon or graphite-based material selected from carbon fiber sheet, paper, web, film, woven fabric, non-woven; expanded graphite film, exfoliated graphite paper, flexible graphite sheet, metal-reinforced flexible graphite, resin-impregnated graphite sheet, graphene paper composite, graphene oxide paper composite, reduced graphene oxide paper composite, carbon nano-fiber paper composite, carbon nano-tube paper composite, carbon fiber-reinforced composite, or a combination thereof. We have found that these carbon- or graphite-based materials have a very wide electrochemical potential window in a wide range of electrolytes. The anode current collector or cathode current collector may also be selected from a stainless steel, a surface-passivated metal, a coated metal, or a carbon-coated metal. The electrolyte may be organic liquid electrolyte, ionic liquid electrolyte, gel electrolyte, polymer electrolyte, or solid electrolyte containing a good amount of magnesium ions when the cell is made. In general, this initial concentration of magnesium ions plays an important role in dictating the energy and power densities of a magnesium cell, a factor that has been thus far unrecognized by other workers in the art.

In the new magnesium-ion cell, the anode active material may contain a pre-magnesiated or non-magnesiated version of graphite, graphite oxide, graphite fluoride, halogen-treated graphite, oxidized meso-carbon micro beads (MCMBs), fluorinated MCMBs, halogen-treated MCMBs, oxidized soft carbon or hard carbon, fluorinated soft carbon or hard carbon, halogen-treated hard carbon or soft carbon, oxidized coke, fluorinated coke, halogen-treated coke, oxidized carbon nanotube, fluorinated carbon nanotube, halogen-treated carbon nanotube, a carbon or graphitic material with an inter-graphene spacing no less than 0.4 nm ($d_{002} \geq 0.4$ nm as determined by X-ray diffraction), or a combination thereof.

Alternatively, the anode active material may be selected from graphene sheets, graphite worms, exfoliated graphite flakes, expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded or etched multi-walled carbon nanotube, nitrogen-doped carbon nanotube, boron-doped carbon nanotube, chemically doped carbon nanotube, ion-implanted carbon nanotube, chemically expanded carbon nano-fiber, or a combination thereof.

The anode active material may contain a single-layer sheet or multi-layer platelet of graphene, graphene oxide, graphene fluoride, hydrogenated graphene, nitrogenated graphene, pristine graphene, doped graphene, boron doped graphene, nitrogen doped graphene, ion-implanted graphene, chemically treated graphene, reduced graphene oxide, functionalized graphene or graphene oxide, or a combination thereof. The anode active material may contain a single-wall carbon nanotube or multi-wall carbon nanotube.

Another preferred embodiment of the present invention is a magnesium-ion cell comprising (a) a positive electrode (cathode) comprising a carbon or graphitic material as a cathode active material having a surface area to capture and store magnesium thereon, wherein said cathode forms a porous structure having a specific surface area greater than 100 $m^2/g$ in direct physical contact with an electrolyte; (b) a negative electrode (anode) comprising a pre-magnesiated anode active material or a combination of a magnesium ion source and an anode active material; (c) a porous separator disposed between the anode and the cathode; and (d) a magnesium-containing electrolyte in ionic contact with the anode and the cathode; wherein the cell has an open circuit voltage (OCV) from 0.5 volts to 3.5 volts (more typically 1.0-2.5 volts) when the cell is made and the cell is then electrochemically formed by operating the cell from said OCV to a lower voltage limit (LVL) lower than said OCV or to a upper voltage limit (UVL) higher than said OCV after the cell is made, wherein said LVL is no lower than 0.1 volts and said UVL is no higher than 3.8 volts. The cell may be subsequently charged to a voltage no higher than said UVL and discharged to a voltage no lower than said LVL.

The anode active material in this cell may contain a pre-magnesiated or non-magnesiated version of graphite, graphite oxide, graphite fluoride, halogen-treated graphite, oxidized meso-carbon micro beads (MCMBs), fluorinated MCMBs, halogen-treated MCMBs, oxidized soft carbon or hard carbon, fluorinated soft carbon or hard carbon, halogen-treated hard carbon or soft carbon, oxidized coke, fluorinated coke, halogen-treated coke, oxidized carbon nanotube, fluorinated carbon nanotube, halogen-treated carbon nanotube, a carbon or graphitic material with an inter-graphene spacing no less than 0.4 nm ($d_{002} \geq 0.4$ nm as determined by X-ray diffraction), or a combination thereof.

The use of this group of anode active materials has led to an unintended, unexpected, and yet profoundly significant consequence: Many of the presumably useful electrolytes for conventional Mg rechargeable cells have high tendency to react with magnesium metal (as the anode active material) forming a passivating surface layer thereon that is not Mg ion-conducting, preventing dissolution of Mg metal during the intended subsequent discharging step. This passivating layer, being electrically insulating, also acts to prevent Mg ion deposition during the re-charging step. Most unexpectedly, the use of the presently disclosed meso-porous carbon/graphite materials as an anode active material overcomes this long-standing, most challenging issue of conventional rechargeable Mg-ion cells. These anode active materials remove the formation of impermeable layer and enable proper charge/discharge cycling for Mg cells containing essentially all Mg salts soluble in all solvents (including aprotic solvents).

In a preferred embodiment, the aforementioned non-magnesiated anode active material is preferably in the form of a nano particle, nano disc, nano platelet, nano wire, nano-rod, nano belt, nano scroll, nano tube, nano filament, nano coating, or nano film.

Preferably, the anode active material is pre-magnesiated to an initial specific capacity of no less than 500 mAh/g (more preferably no less than 1,000 mAh/g and most preferably no less than 1,500 mAh/g) based on the anode active material weight. Preferably, when the Mg-ion cell containing such a pre-magnesiated anode active material is discharged, the anode active material remains not fully discharged; preferably, the anode active material maintains at least 50% of the initial specific capacity.

The present invention also provides a magnesium-ion cell comprising: (a) a positive electrode (cathode); (b) a negative electrode (anode) comprising a pre-magnesiated anode active material or a combination of a magnesium ion source and an anode active material, wherein the anode active material is selected from single-layer or multi-layer graphene, graphene oxide, graphene fluoride, hydrogenated graphene, nitrogenated graphene, pristine graphene, doped graphene, boron doped graphene, nitrogen doped graphene, ion-implanted graphene, chemically treated graphene, reduced graphene oxide, functionalized graphene or graphene oxide, graphite worms, activated graphite worms, activated exfoliated graphite flakes, activated expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded or etched multi-walled carbon nanotube, nitrogen-doped carbon nanotube, boron-doped carbon nanotube, chemically doped carbon nanotube, ion-implanted carbon nanotube, chemically expanded carbon nano-fiber, hydrogenated graphene, nitrogenated graphene, doped graphene, boron doped graphene, nitrogen doped graphene, ion-implanted graphene, chemically activated graphene, or a combination thereof; (c) a porous separator disposed between the anode and the cathode; and (d) a magnesium-containing electrolyte in ionic contact with the anode and the cathode. In general, the cell has an open circuit voltage (OCV) from 0.3 volts to 2.5 volts when the cell is made.

The cathode active material that can be used in this new Mg-ion cell includes (A) Chevrel phase $Mo_6S_8$, $MnO_2$, CuS, $Cu_2S$, $Ag_2S$, $CrS_2$, and $VOPO_4$; (B) layered compounds $TiS_2$, $V_2O_5$, $MgVO_3$, $MoS_2$, $MgV_2O_5$, and $MoO_3$; (C) Spinel structured compounds $CuCr_2S_4$, $MgCr_2S_4$, $MgMn_2O_4$, $Mg_{0.67}Ni_{1.33}O_2$, and $Mg_2MnO_4$; (D) NASICON structured compounds including $MgFe_2(PO_4)_3$ and $MgV_2(PO_4)_3$; (E) Olivine structured compounds including $MgMnSiO_4$ and $MgFe_2(PO_4)_2$; (F) Tavorite structured compound $Mg_{0.5}VPO_4F$; (G) pyrophosphates $TiP_2O_7$ and $VP_2O_7$; (H) sulfur (electrophilic sulfur); and (I) $FeF_3$, and their combinations.

DESCRIPTION OF THE PREFERRED EMBODIMENTS

The present invention provides a magnesium-ion cell comprising: (a) a positive electrode (cathode) comprising a carbon or graphitic material as a cathode active material having a surface area to capture and store magnesium thereon, wherein the cathode forms a porous structure having a pore size in the range from 1 nm to 100 nm (preferably a meso-porous structure having a pore size in the range of 2-50 nm) and a specific surface area greater than 50 m$^2$/g (preferably >100 m$^2$/g, further preferably >500 m$^2$/g, further preferably >1,000 m$^2$/g, and most preferably >1, 500 m$^2$/g; (b) a negative electrode (anode) comprising an anode current collector alone or a combination of an anode current collector and an anode active material; (c) a porous separator disposed between the anode and the cathode; (d) an electrolyte in ionic contact with the anode and the cathode; and (e) a magnesium ion source disposed in the anode to obtain an open circuit voltage (OCV) from 0.5 volts to 3.5 volts when the cell is made. This OCV is simply measured by connecting a voltage-measuring circuit (typically available in a battery tester or electrochemical testing station) to the anode and the cathode before the cell is allowed to undergo any charge or discharge.

It may be noted that these high surface areas are in direct contact with the electrolyte that carries Mg$^{2+}$ ions therein. These Mg$^{2+}$ ions can be readily captured by the active surfaces of the meso-porous graphitic/carbon material without having to undergo slow solid-state diffusion. In other words, the Mg$^{2+}$ ions can readily approach active material surfaces without intercalation (in contrast to the conventional Mg cells that require Mg$^{2+}$ ions to diffuse into the bulk of a conventional intercalation compound, such as Chevrel phase and graphite fluoride, as a cathode active material). This intercalation-free strategy enables a high specific power (W/kg), which is several orders of magnitude higher than those of current Mg-ion and Li-ion cells.

Figure 1:
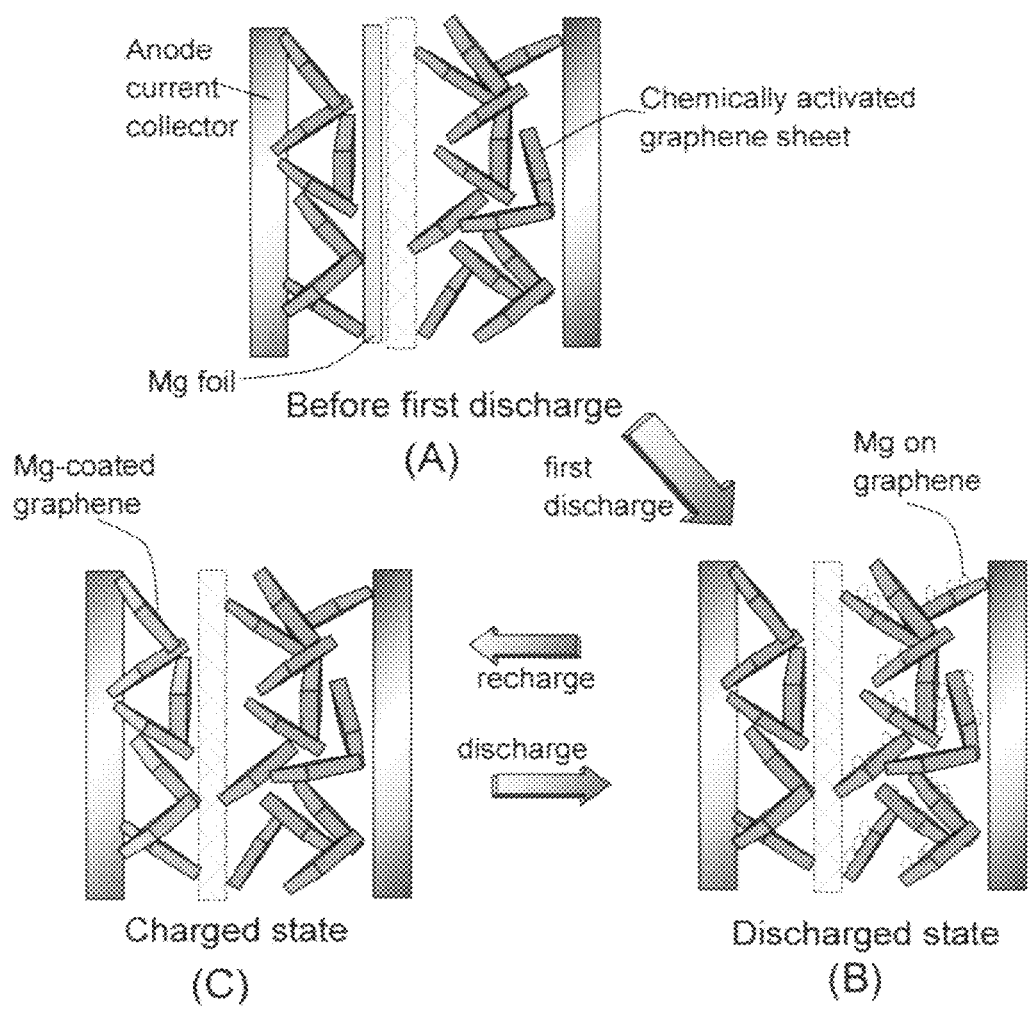
FIG. 1 (A) A Mg-ion cell containing a meso-porous graphitic material (e.g. graphene sheets reconstituted into a meso-porous structure) as a cathode active material according to one embodiment of the instant invention. This is a schematic showing a possible structure of this new type of Mg-ion cell when it is made (prior to the first discharge cycle); (B) The structure of this cell after its first discharge operation (magnesium is ionized with the Mg ions diffusing through liquid electrolyte to reach massive surfaces of the meso-porous graphitic material at the cathode); (C) The structure of this battery device after being re-charged (magnesium ions are released from the cathode, diffusing through liquid electrolyte to reach the anode and get electrochemically plated onto surfaces of graphene sheets as an anode active material).

FIG. 1(A) presents an example of the new Mg-ion cell containing a meso-porous graphitic material (e.g. graphene sheets) as a cathode active material according to one embodiment of the instant invention. This is a schematic showing a possible structure of this new type of Mg-ion cell when it is made (prior to the first discharge cycle. FIG. 1(B) illustrates the structure of this cell after its first discharge operation during which magnesium is ionized or dissolved emitting massive Mg ions into liquid electrolyte. These Mg ions diffuse to reach the meso-porous graphitic material at the cathode and get captured by graphene surfaces. FIG. 1 (C) illustrates the structure of this battery device after being re-charged. Magnesium ions are released from the cathode, diffusing through liquid electrolyte to reach the anode and get electrochemically plated onto surfaces of graphene sheets as an anode active material, re-establishing an electrochemical potential differential between the anode and the cathode.

The present invention also provides a method of operating this new Mg-ion cell. The operating method comprises: (A) electrochemically forming the cell from the OCV to either a first lower voltage limit (LVL) different from the OCV or a first upper voltage limit (UVL) higher than the OCV after the cell is made, wherein the first LVL is no lower than 0.1 volts and the first UVL is no higher than 4.0 volts (preferably no higher than 3.8 volts); and (B) cycling the cell by discharging the cell to a voltage no lower than a second LVL and charging the cell to a voltage no higher than a second UVL. The first LVL is preferably identical to the second LVL, but can be different. The first UVL is preferably identical to the second UVL, but can be different.

This new Mg-ion cell contains a meso-porous graphitic or carbonaceous material-based positive electrode (cathode) containing active surfaces for capturing and storing magnesium atoms thereon. The graphitic material may be selected from graphene sheets, graphite worms, exfoliated graphite flakes, expanded graphite, chemically treated graphite with an inter-graphene planar separation no less than 0.4 nm (preferably greater than 0.5 nm, and more preferably greater than 0.6 nm), soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nano-tube, chemically expanded carbon nano-fiber, or a combination thereof. Although not required or desired, the graphitic material optionally may also have the capability to store some magnesium in the bulk (interior) of graphitic material particles if these particles have not been fully expanded or exfoliated.

Figure 2:
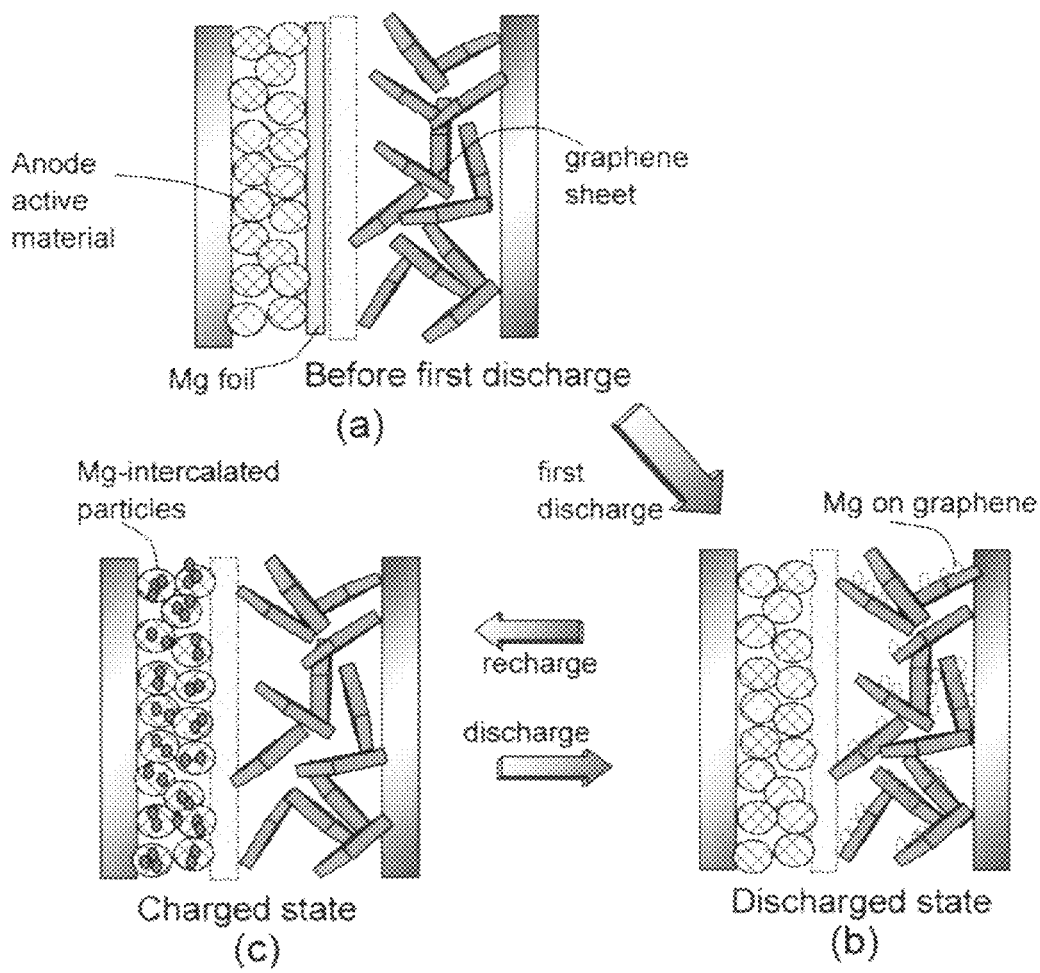
FIG. 2 (A) A Mg-ion cell containing a meso-porous graphitic material (e.g. graphene) as a cathode active material according to another embodiment of the instant invention. This is a schematic showing a possible structure of this new type of Mg-ion cell when it is made (prior to the first discharge cycle); (B) The structure of this cell after its first discharge operation (Magnesium is ionized with the Mg ions diffusing through liquid electrolyte to reach the meso-porous graphitic material at the cathode); (C) The structure of this battery device after being re-charged (magnesium ions are released from the cathode, diffusing through liquid electrolyte to reach the anode and intercalate into the interior of anode active material particles, such as fluorinated graphite with expanded inter-graphene spacing, $d_{002}$>0.40 nm).

FIG. 2(A) illustrates another example of the Mg-ion cell containing a meso-porous graphitic material (e.g. graphene) as a cathode active material according to another embodiment of the instant invention. This is a schematic showing a possible structure of this new type of Mg-ion cell when it is made (prior to the first discharge cycle). Illustrated in FIG. 2(B) is the structure of this cell after its first discharge operation during which magnesium is ionized or dissolved to release massive Mg ions into liquid electrolyte. These Mg ions diffuse to the meso-porous graphitic material at the cathode where they are captured by graphene surfaces. FIG. 2(C) shows the structure of this battery device after being re-charged. Magnesium ions are released from the cathode, diffusing through liquid electrolyte to reach the anode and intercalate into the interior of anode active material particles, such as fluorinated graphite with expanded inter-graphene spacing, $d_{002}$>0.40 nm. Upon fluorination, halogenation, or oxidation, natural or synthetic graphite undergoes an expansion of inter-graphene plane distance, from an original 0.335-0.341 nm to an increased distance of typically >0.4 nm (more typically between 0.5 and 1.0 nm).

Figure 4:
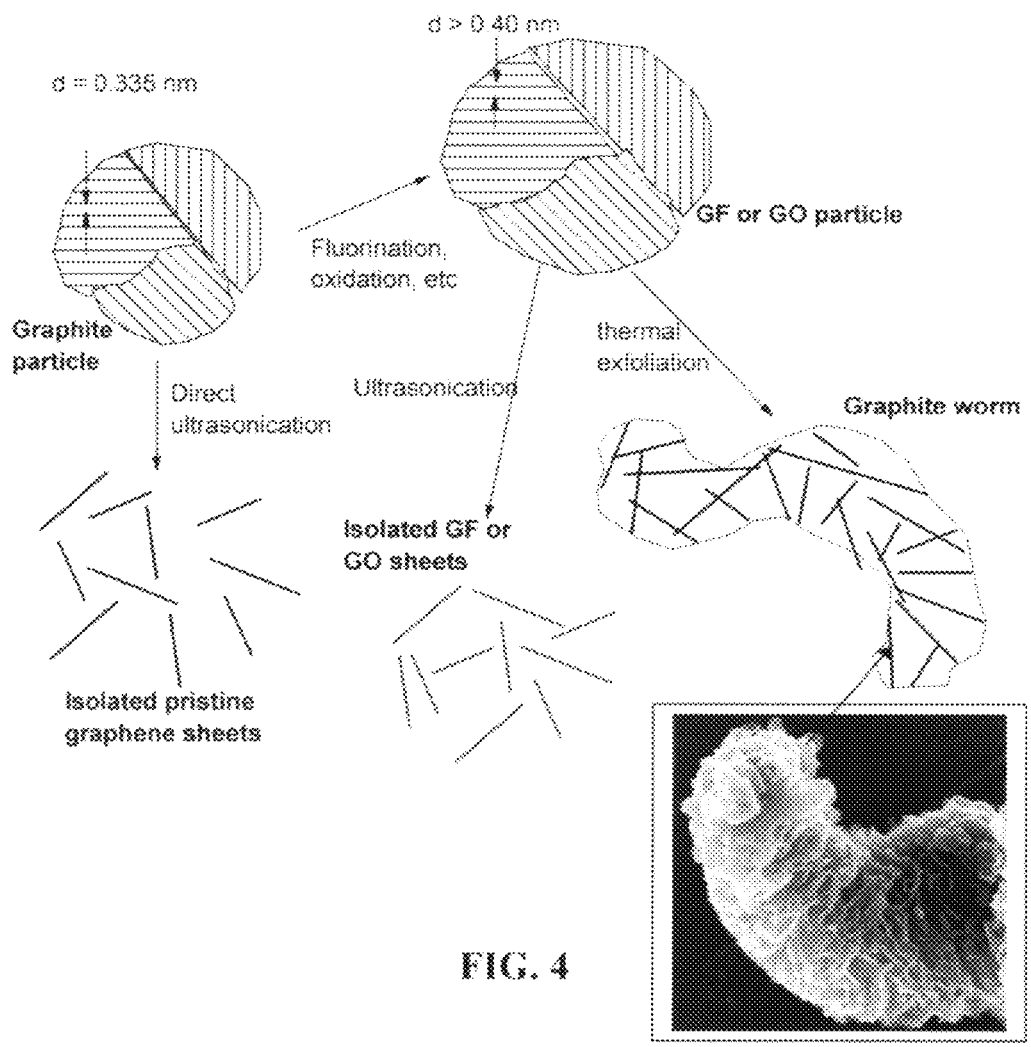
FIG. 4 Schematic of selected procedures for producing pristine graphene sheets, graphite oxide or graphite fluoride with an expanded inter-graphene spacing, and exfoliated graphite (graphite worms) from graphite.

As schematically illustrated in FIG. 4, a natural or artificial graphite particle is typically composed of several graphite crystal grains or crystallites (3 being shown) with each crystallite made up of multiple graphene planes bonded via van der Waals forces in the c-direction (a direction perpendicular to the graphene plane). The inter-graphene plane spacing, $d_{002}$ as measured by X-ray diffraction, is typically from 0.335 nm (natural graphite) to 0.337 (artificial graphite). Graphite particles, without any chemical intercalation, oxidation, fluorination, etc, can be dispersed in water containing a surfactant and the resulting suspension subjected to high-power ultrasonic wave treatment to produce pristine graphene, a process commonly referred to as direct ultrasonication or liquid phase production. The resulting pristine graphene sheets are relatively defect-free and exhibit exceptional thermal conductivity and electric conductivity.

Figure 7A:
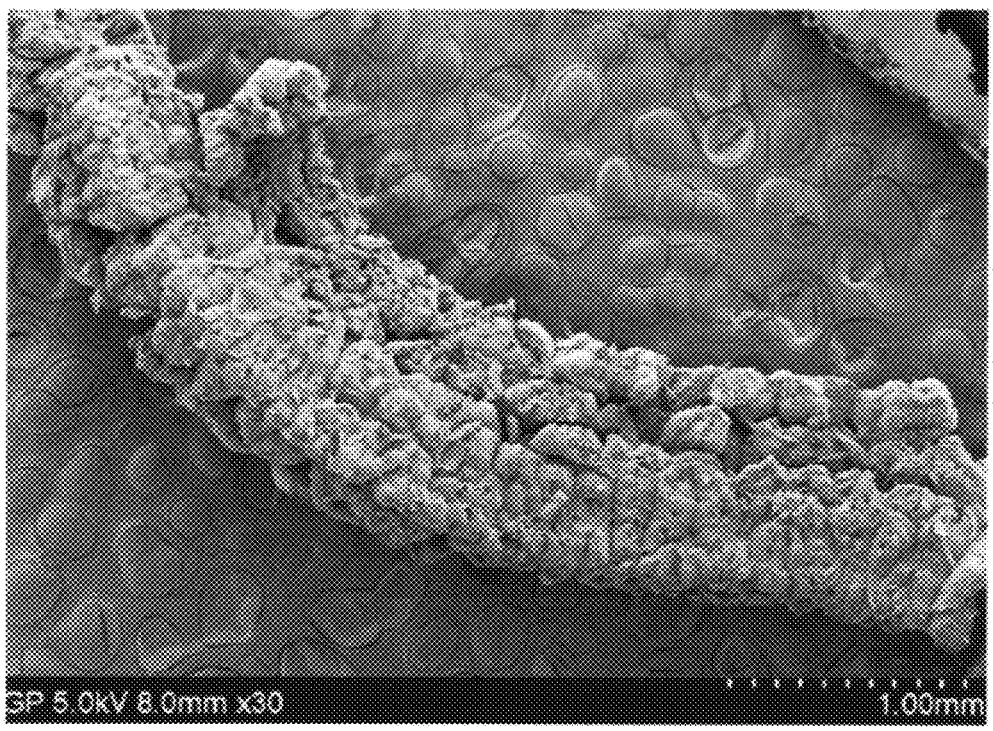
FIG. 7 (A) SEM image of a graphite worm; (B) SEM image of another graphite worm taken at a higher magnification; (C) SEM image of a meso-porous graphitic structure prepared by exfoliating a soft carbon; (D) SEM image of a meso-porous graphitic structure prepared by chemically etching or expanding a hard carbon material; (E) SEM image of an expanded MCMB; (F) SEM image of expanded carbon fibers; and (G) SEM image of a meso-porous structure made of graphene sheets re-constituted into an approximately spherical shape.
Figure 7B:
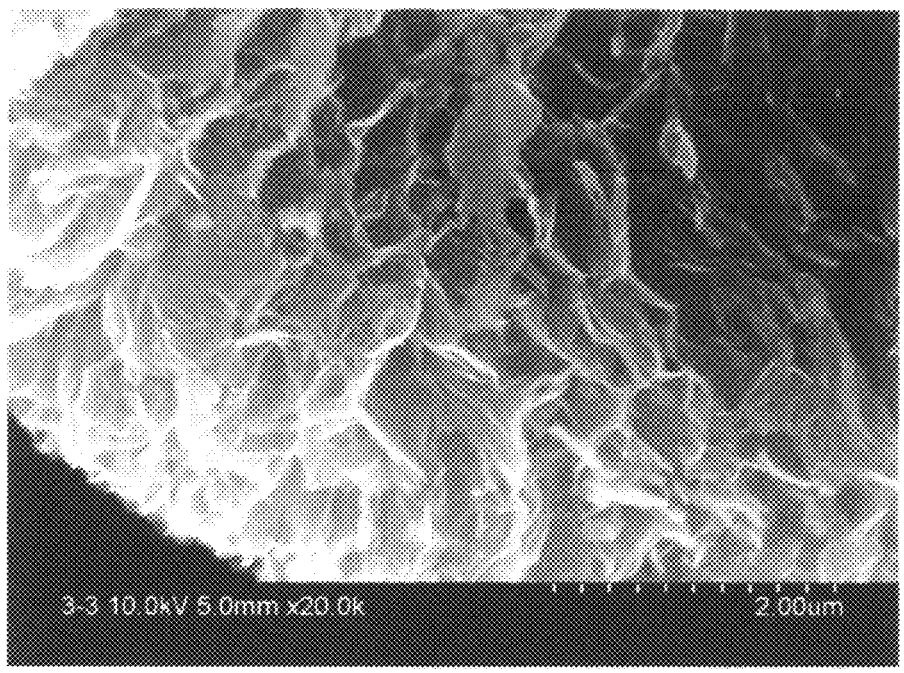

Alternatively, as illustrated in the upper-right portion of FIG. 4, graphite particles may be subjected to an oxidation, fluorination treatment (or other types of halogenation or chemical expansion treatments), or intercalation (e.g. in a mixture of sulfuric acid and nitric acid) to produce graphite oxide (GO), graphite fluoride (GF), or graphite intercalation compound (GIC). The GO, GF, or GIC may be subsequently subjected to an ultrasonication treatment to exfoliate/separate graphene planes, forming isolated (separated) graphene oxide or graphene fluoride sheets. Alternatively, the GO, GF, or GIC may be subsequently subjected to a thermal exfoliation treatment (typically in a temperature of 150-1200° C., more typically 650-1050° C.) to obtain exfoliated graphite (or graphite worms). A graphite worm is a worm-like, highly porous structure composed of networks of weakly interconnected graphite flakes and/or graphene sheets. Two SEM images of graphite worms are presented in FIGS. 7(A) and (B).

Graphite worms may be optionally subjected to mechanical shearing (e.g. air-jet milling) to produce expanded graphite flakes (thickness >100 nm, if original graphite received insufficient oxidation, fluorination, or intercalation) or nano graphene platelets (NGPs with a thickness <100 nm and more typically <10 nm, including multi-layer graphene platelets or single-layer graphene sheets, as thin as 0.34 nm, if the original graphite has been heavily oxidized, fluorinated, or intercalated). The graphite worms or the isolated graphene platelets/sheets (NGPs) may be further subjected to a chemical activation or etching treatment to generate more defects or pores therein or thereon.

The carbon or graphitic material in the cathode preferably contains a single-layer sheet or multi-layer platelet of graphene, graphene oxide, graphene fluoride, hydrogenated graphene, nitogenated graphene, pristine graphene, doped graphene, boron doped graphene, nitrogen doped graphene, chemically treated graphene, reduced graphene oxide, functionalized graphene or graphene oxide, chemically etched or activated graphene, or a combination thereof. Preferably, multiple sheets or platelets are combined to form a meso-porous structure having a pore size in the range of 2 nm to 50 nm, most preferably having a majority of the pores sized between 2 nm and 10 nm.

Nitrogenated graphene, nitrogen-doped graphene, or boron-doped graphene can be produced from chemical synthesis, chemical vapor deposition (CVD), or ion implantation. For instance, nitrogen-doped graphene can be produced from CVD using $CH_4$ as a carbon source, $NH_3$ as a nitrogen source, nano-scaled Cu/Ni particles (or Cu, Ni, or Cu/Ni, foil) as a catalyst. Boron-doped graphene can be produced by boron ion implantation.

Figure 5:
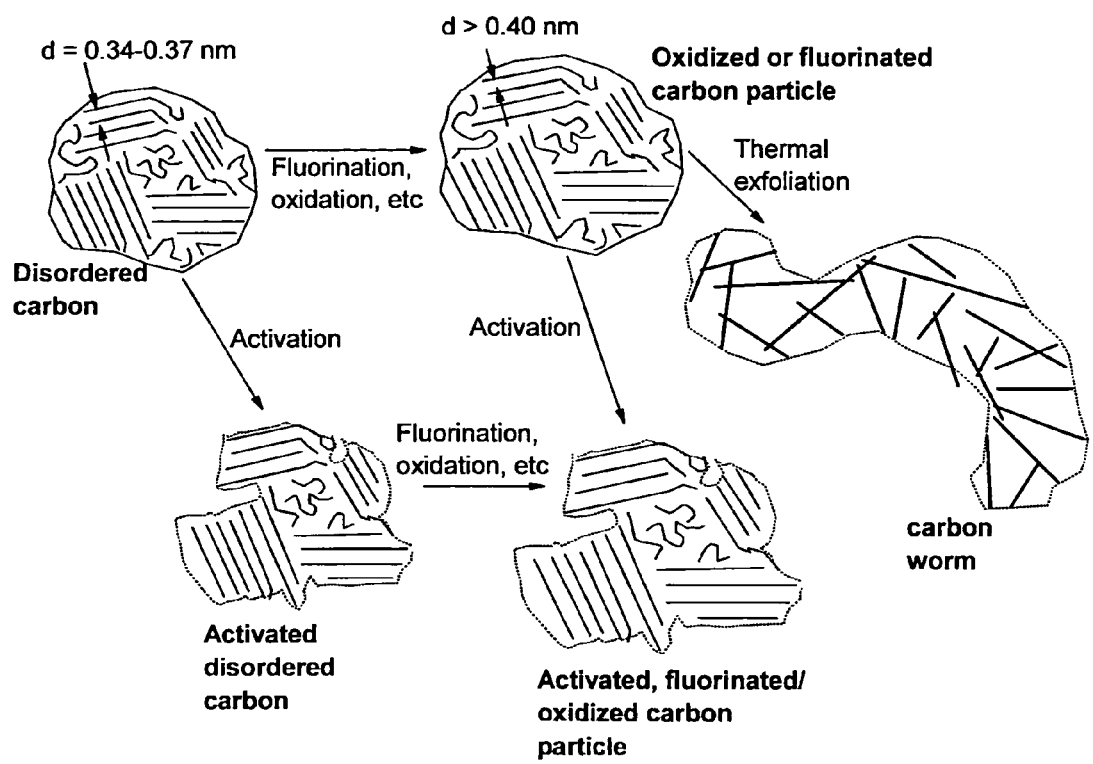
FIG. 5 Schematic of selected procedures for producing activated disordered carbon, oxidized or fluorinated carbon with an expanded inter-graphene spacing, exfoliated carbon (carbon worms), and activated/expanded carbon from disordered carbon.

In addition to graphite, many carbonaceous materials (e.g. disordered carbon, such as soft carbon, hard carbon, carbon black, carbonized resin, coke, meso-phase pitch or carbon, etc) can be used to form a desired meso-porous structure. These carbon materials all have one thing in common: they all have graphene planes (or smaller aromatic ring domains) dispersed in an amorphous carbon matrix. Although not as large in length/width as those in natural graphite, the graphene planes in soft carbon, for instance, are much larger than in carbon black. The edges or primary surfaces of these graphene planes can be made to be exposed to liquid electrolyte in a battery cell if some of the amorphous carbon material is chemically etched away or "activated" and/or if the inter-graphene spacing in the graphene domain or crystallite is expanded through an oxidation, fluorination, halogenation, or intercalation treatment, as illustrated in FIG. 5.

Figure 6:
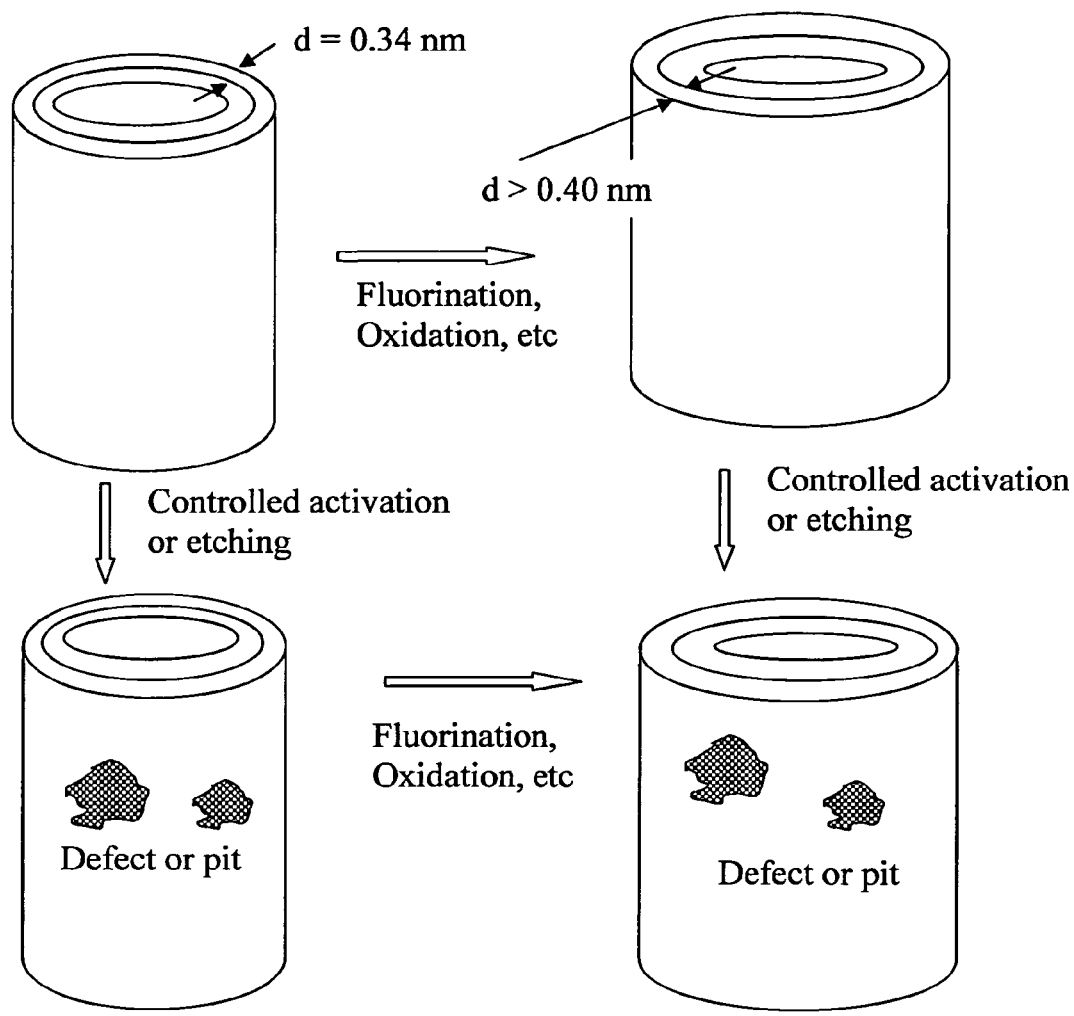
FIG. 6 Schematic of selected procedures for producing activated carbon nanotubes, oxidized or fluorinated CNTs with an expanded inter-graphene spacing, and activated/expanded CNTs from multi-walled CNTs.

Alternatively, the carbon or graphitic material in the cathode may contain a single-wall carbon nanotube or multi-wall carbon nanotube. Further preferably, carbon nanotubes are subjected to doping, ion implementation, chemical etching, fluorinating treatment, halogen treatment, heavy oxidation, or chemical treatment to generate defects to the cylindrical graphene layers that constitute the nanotube and/or to increase the spacing between cylindrical graphene planes from the original spacing of approximately 0.34 nm to an expanded spacing of greater than 0.4 nm, preferably greater than 0.5 nm, further preferably greater than 0.6 nm. This procedure is schematically illustrated in FIG. 6. Chemical etching helps to creates channels for Mg ion migration to enter additional places inside a CNT structure. We have found that expanded inter-graphene layer spacing in multi-walled CNTs can significantly increase the magnesium-capturing capacity in the cathode. It is desirable to pack treated carbon nanotubes into a meso-porous electrode structure having a pore size in the range of 2 nm to 50 nm, most preferably having a majority of the pores sized between 2 nm and 10 nm. The same type of treated CNTs can be used as an anode active material.

Figure 7C:
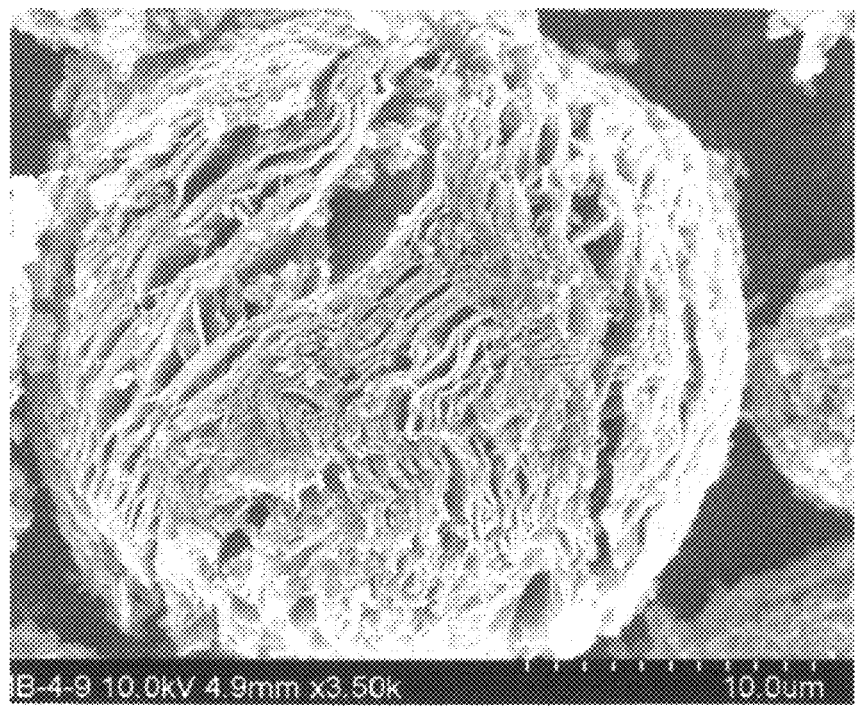
Figure 7:
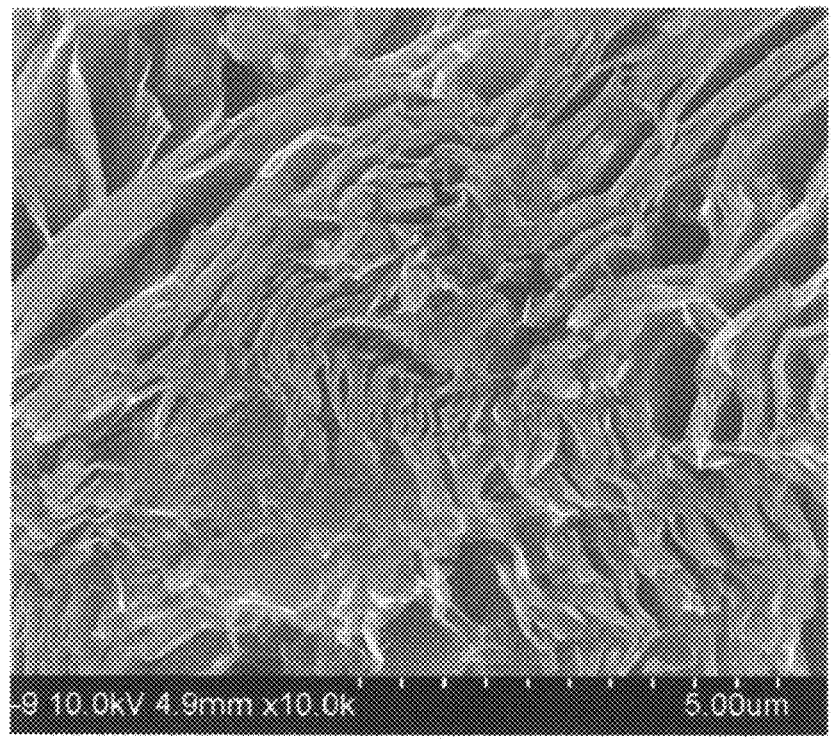
Figure 7E:
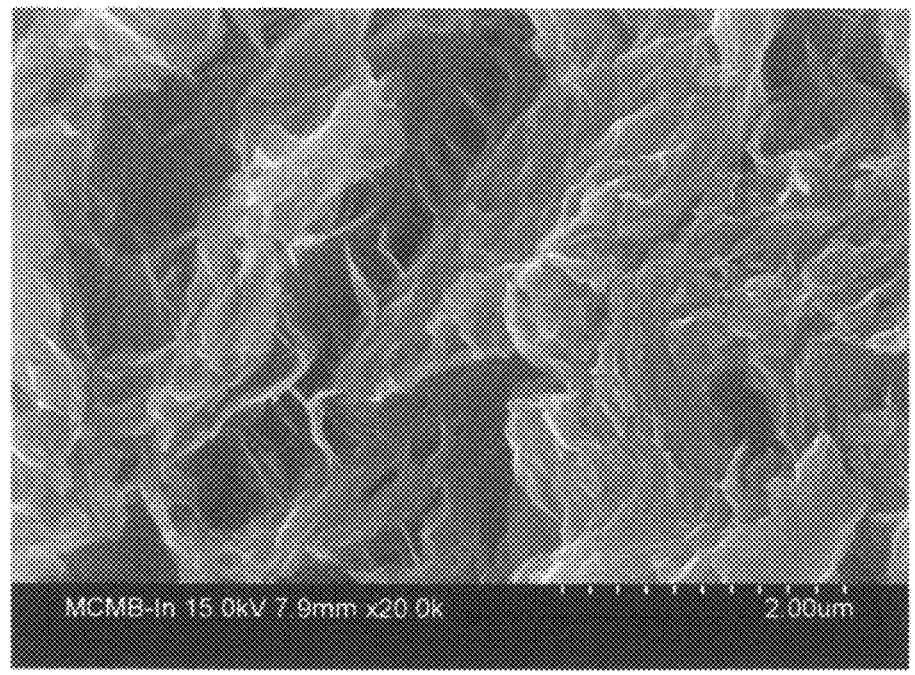
Figure 7F:
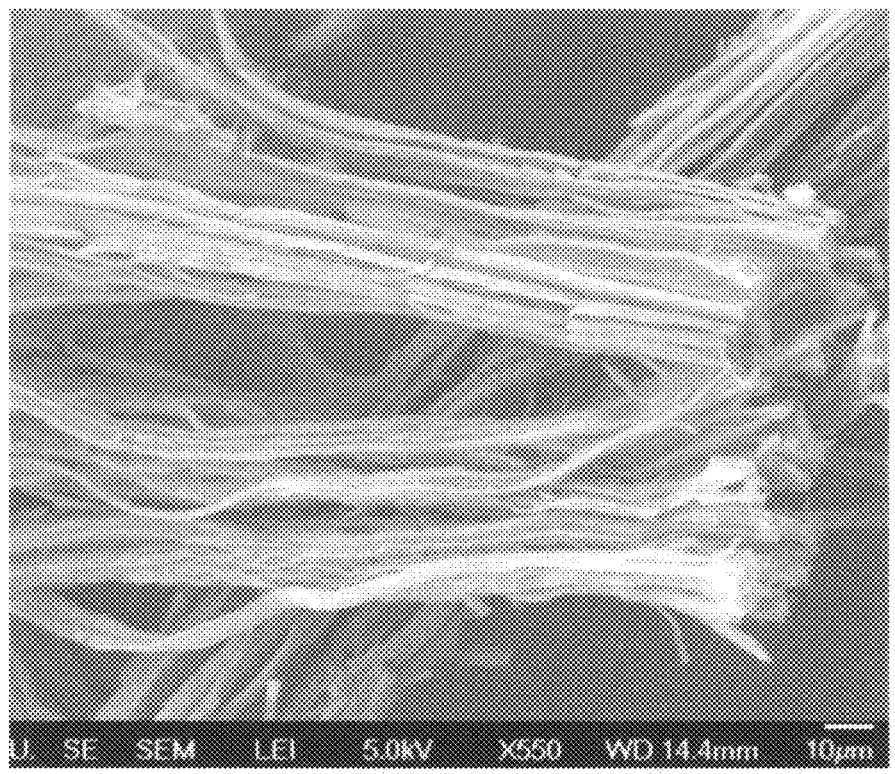
Figure 7G:
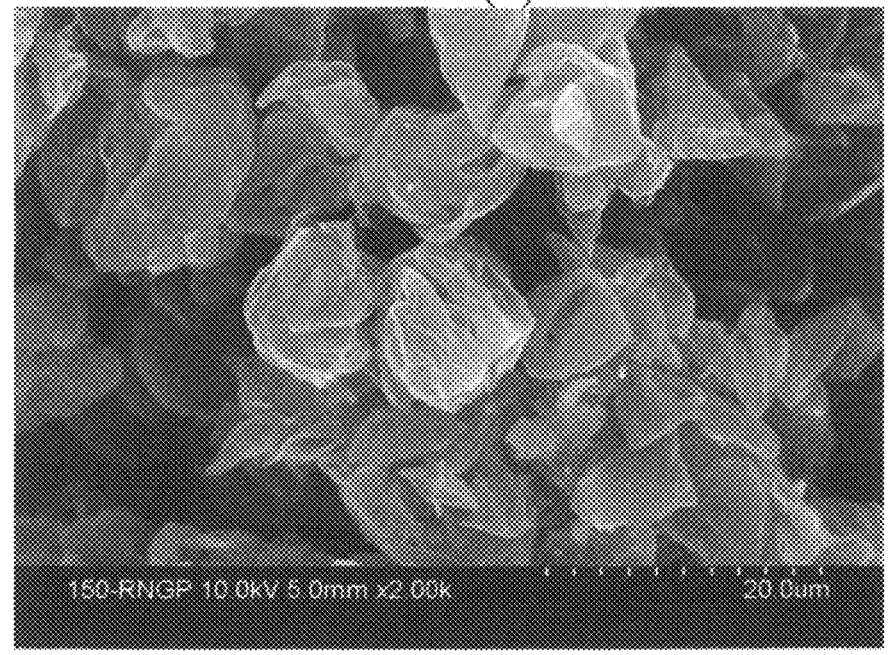

Shown in FIG. 7(C) is an SEM image of a meso-porous graphitic structure prepared by exfoliating a soft carbon. FIG. 7(D) is an SEM image of a meso-porous graphitic structure prepared by chemically etching or expanding a hard carbon material Presented in FIG. 7(E) is an SEM image of an expanded MCMB and FIG. 7(F) is an SEM image of expanded carbon fibers. FIG. 7(G) is an SEM image of a meso-porous structure made of graphene sheets re-constituted into an approximately spherical shape.

The meso-scaled pores (2-50 nm, preferably 2-10 nm) allow the entry of electrolyte, exposing more carbon-hexagon planes (aromatic rings or graphene planes) in the meso-porous graphitic or carbonaceous material to the electrolyte. This is advantageous because these pores enable a greater amount of surface areas to be in physical contact with electrolyte and capable of capturing magnesium ions directly from the electrolyte. These magnesium ions thus do not have to travel to these planes or surfaces through otherwise very slow internal solid-state diffusion. Such an arrangement surprisingly leads to very high energy density as well as high power density. These surface areas are typically and preferably >50 $m^2/g$, more preferably >500 $m^2/g$, further more preferably >1,000 $m^2/g$, and most preferably >1,500 $m^2/g$.

In summary, graphite crystals in a graphitic or carbonaceous material contain graphene planes having an inter-graphene plane spacing of approximately 0.34 nm. We have experimentally observed that, by oxidizing or fluorinating the graphite crystals one can increase the inter-graphene spacing to >0.40 nm, more typically >0.50 nm, and most typically >0.60 nm. We have further observed that these expanded graphite crystals with extra spaces between graphene planes and perhaps modified bonding energetics are more conducive to accommodating great amounts of magnesium atoms when used as a cathode active material. The procedures for creating the graphite, carbon material, and carbon nanotube with expanded inter-graphene spacing ($d_{002}$) are presented in FIGS. 4, 5, and 6, respectively. In these drawings, we also illustrate the chemical activation or etching treatment to further improve the Mg storage capability of a variety of carbon and graphite materials via creation of meso-scaled pores (2-50 nm).

The presently invented Mg-ion cell also contains a negative electrode (anode) comprising an anode active material for attaching (or inserting) and detaching (or extracting)

magnesium during the charging and discharging cycles of the cell, wherein the anode active material is preferably mixed with a conductive additive and/or a resin binder to form a porous electrode structure, or coated onto a current collector in a coating or thin film form (e.g. film thickness <200 μm). The anode active material preferably has a magnesium storage capacity greater than 300 mAh/g, further preferably greater than 400 mAh/g, more preferably greater than 600 mAh/g, and most preferably greater than 800 mAh/g. This is by no means a trivial task since there has been no prior art teaching on an anode active material capable of storing Mg up to such a capacity, further discussed below. (Actually, there has been practically no teaching about a Mg-ion cell containing an anode active material. Instead, what has been taught is all related to Mg cell without an anode active material other than Mg metal per se.)

This anode active material may also be selected from a wide variety of graphitic and carbonaceous materials, including graphite (natural graphite and artificial graphite), disordered carbon (including meso-phase carbon, soft carbon, hard carbon, coke, etc), and carbon nanotubes. Again, for use in the anode, it is particularly desirable to expand the inter-graphene spacing of these materials from approximately 0.335-0.337 nm to >0.40 nm (preferably >0.5 nm). This has surprisingly enabled these materials with expanded inter-graphene spacing to store Mg up to 1,000 mAh/g, as opposed to typically less than 100 mAh/g capacity for un-treated/unexpanded counterparts. These unexpanded graphitic materials, although capable of storing Li atoms up to a theoretical capacity of 372 mAh/g in a Li-ion cell, can only store Mg atoms up to 100 mAh/g, mostly much lower than 30 mAh/g, in a Mg-ion cell. It is important to stress that the graphitic or carbon materials subjected to the oxidation or fluorination treatment has been significantly modified in terms of not only an expanded inter-graphene plane spacing but also chemical composition (e.g. from graphite to graphite oxide), hence internal bonding environment. This new environment appears to be favorable to accepting Mg ions that are divalent.

The anode active material is preferably a nano-scaled material having a dimension less than 100 nm, preferably less than 20 nm. This will significantly reduce the required Mg ion diffusion path, thereby increasing the power density of a Mg-ion cell.

The Mg-ion cell further contains a porous separator disposed between the anode and the cathode; a magnesium-containing electrolyte in physical contact with the two electrodes (the anode and the cathode); and a magnesium source disposed in at least one of the two electrodes when the cell is made. The anode active material can be pre-magnesiated or not pre-magnesiated. The pre-magnesiated material is a material that has been partially or fully loaded with magnesium atoms in the interior (e.g., through inter-calation) or on the surfaces (e.g. through electrochemical deposition or plating). This pre-magnesiation step can be carried out prior to the production of a Mg-ion cell, or after the cell is made, by bringing the intended anode active material in direct contact with a piece of magnesium foil in the presence of an electrolyte liquid.

Several types of magnesium ion sources may be implemented to provide the magnesium ions that are needed for shuttling between the anode and the cathode. Examples of the $Mg^{2+}$ sources are magnesium chip, magnesium alloy chip, magnesium foil, magnesium alloy foil, magnesium powder, magnesium alloy powder, magnesium particles, magnesium fibers or rods, magnesium or magnesium alloy film coated on a surface of an anode material or current collector, or a combination thereof.

To further illustrate the operational principle of this new high-capacity Mg-ion battery, one may consider a case wherein a magnesium source (e.g. small pieces of magnesium alloy foil) is implemented between an anode (e.g. comprising graphite fluoride particles having an expanded inter-graphene spacing of 0.72 nm or carbon nanotubes, and conductive additives bonded together by a resin) and a porous polymer separator when the battery device is made, and wherein a porous cathode comprises graphene sheets or graphite worms (FIG. 3A-C) having surface areas capable of capturing and storing magnesium thereon. The cathode structure contains pores that are preferably meso-scaled (2 nm-50 nm), but can be larger than 50 nm (e.g. in graphite worms). It may be noted that the electrolyte typically contains some magnesium salt (containing $Mg^{+2}$ ions) when the cell is made. In principle, one can begin to electrochemically "form" (activate) the cell by taking a first step of charging the cell, effectively driving the pre-existing $Mg^{2+}$ ions to the anode side. However, we have found that this is not the best practice. Instead, it is preferred that the cell is prescribed to undergo a discharging step first, instead of charging, as the electrochemical formation step. This has resulted in a significantly higher cathode capacity and cell energy density, a completely unexpected result.

Figure 3:
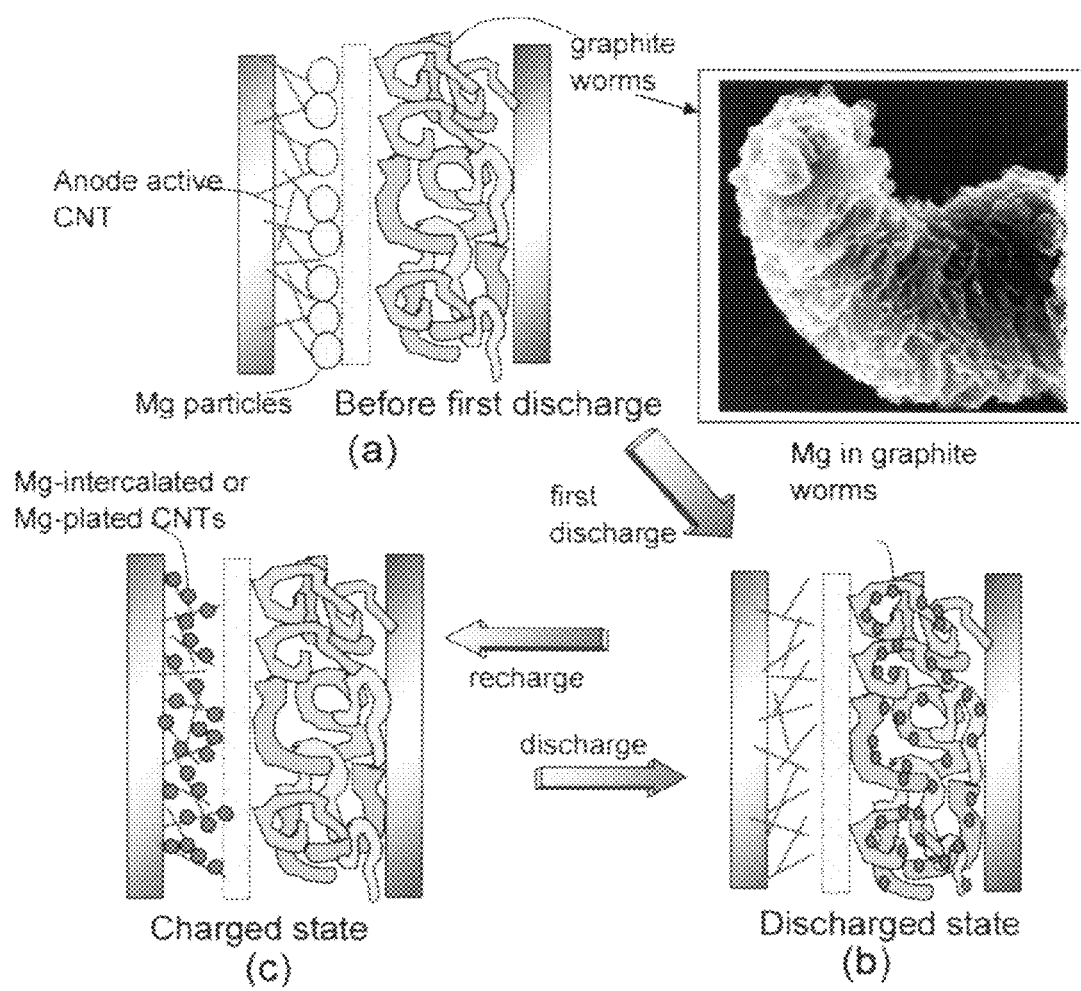
FIG. 3 (A) A magnesium-ion cell containing a meso-porous graphitic material (e.g. graphite worms) as a cathode active material according to yet another embodiment of the instant invention. This is a schematic showing a possible structure of this new type of Mg-ion cell when it is made (prior to the first discharge cycle); (B) The structure of this cell after its first discharge operation (magnesium is ionized with the Mg ions diffusing through liquid electrolyte to reach the meso-porous graphitic material at the cathode); (C) The structure of this battery device after being re-charged (magnesium ions are released from the cathode, diffusing through liquid electrolyte to reach the anode and intercalating into the interior and/or depositing onto the surface of activated/expanded CNTs as an anode active material).

Referring to FIGS. 3(A)-(C), during the first discharge operation, magnesium particles are ionized to generate Mg ions which are released into the liquid electrolyte. These Mg ions rapidly migrate through the pores of the polymer separator into the cathode side. Since the cathode is also meso-porous having interconnected pores to accommodate liquid electrolyte therein, Mg ions basically just have to sail through liquid to reach an active site on a surface or edge of a graphite flake or graphene sheet at the cathode. The graphite flake surface or graphene sheet is in direct contact with electrolyte and readily accepts Mg ions from the electrolyte. One can discharge the cell to the extent that the cell shows a voltage level (the first LVL), with this first LVL preferably higher than 0.1 volts, more preferably higher than 0.5 volts, and most preferably higher than 0.75 volts (but preferably no higher than 1.0 volts).

After this electrochemical formation step, the cell can then be charged to an upper voltage level (herein referred to as the second UVL) and then discharged to a second LVL. Subsequently, the cell may be cycled between a LVL and a UVL.

Because all the initial electrochemical formation steps (magnesium ionization or dissolution, liquid phase diffusion, and surface trapping/capturing) are fast and no solid-state diffusion is required, the whole process is very fast, enabling fast discharging of the cell and a high power density.

In the above example, the discharge process continues until either the magnesium particles are completely ionized or all the active sites on the cathode active materials are occupied by magnesium atoms, or when a desired LVL is reached. During re-charge, magnesium ions are released from the surfaces of the cathode active material, diffuse through liquid electrolyte, and intercalate into the bulk of an anode active material (e.g. graphite fluoride particles). This intercalation step involves solid-state diffusion and hence, can be slow. However, we have found that the solid-state diffusion time can be significantly reduced if the anode active material is made into a nano-scaled structure; e.g. in the form of a nano particle, nano disc, nano platelet, nano wire, nano-rod, nano belt, nano scroll, nano tube, nano filament, nano coating, or nano film. This recharge process is stopped when a desired UVL is reached.

The surfaces of a meso-porous graphitic cathode material are capable of capturing Mg ions directly from a liquid electrolyte phase and storing magnesium atoms on the surfaces in a reversible and stable manner. This is a completely new electrochemistry that has never been discovered by anybody other than our research group. All other research groups have selected some kinds of Mg intercalation compounds (e.g. $MgMnSiO_4$) or conversion compound (e.g. sulfur) as a cathode active material in a magnesium cell.

During the discharge process, Mg ions are released from the anode, and the graphitic material surfaces at the cathode continue to absorb Mg ions from the liquid electrolyte and store Mg on graphitic material surfaces or interior, maintaining a low Mg ion content in the liquid electrolyte, lower than or equal to the Mg ion solubility limit in the liquid. This process continues until the active surface sites of the graphitic material at the cathode are saturated with Mg, and/or when the cell voltage reaches a desired or pre-set LVL. This saturation limit can be many times greater than the Mg ion solubility limit in the liquid electrolyte provided the specific surface area of the cathode active material is sufficiently high (e.g. higher than 50 $m^2/g$). Such a high Mg amount on cathode surfaces implies a high energy density.

The cathode active material has a high specific surface area (>50 $m^2/g$) that is in direct contact with the electrolyte (e.g. being directly immersed in electrolyte) and surprisingly capable of capturing Mg ions from the electrolyte and storing the Mg atoms in the surface active sites. There has been no prior art teaching about this capability of graphitic material surfaces. Preferably, the cathode as an electrode forms a meso-porous structure having a pore size in the range of 2 nm and 50 nm, enabling easy entry of liquid electrolyte into the porous interior of a graphitic material particle and exposing surface active sites to Mg ion-containing electrolyte. Preferably, the cathode has a specific surface area no less than 500 $m^2/gram$ (preferably >1,000 $m^2/gram$, and more preferably >1,500 $m^2/gram$) to store or support Mg ions or atoms thereon.

It has been commonly believed that a high specific surface area is an undesirable feature of either an anode or a cathode for a lithium-ion cell or Mg-ion cell based on the belief that a higher surface area leads to the formation of more solid-electrolyte interface (SEI), a common cause of capacity irreversibility or capacity loss. We have herein defied this expectation and discovered that the meso-porous graphitic cathode materials can be superior cathode materials for Mg-ion cells, which could operate thousands of cycles without any significant capacity decay. This is so in spite of or despite of the notion that both graphite and carbon materials, when used as an anode active material in a Li-ion cell, have serious SEI issue. The successful use of high surface area carbon or graphitic materials in the anode and/or cathode of a Mg-ion cell is truly unexpected.

Even more surprisingly, the meso-porous carbonaceous or graphitic materials, when incorporated as a cathode active material, having a specific surface area greater than 50 $m^2/g$ and pores of 2-50 nm in size, exhibit a specific capacity significantly higher than that of any commonly used magnesium ion cell cathode, and lithium ion cell cathode as well.

In an embodiment of the present invention, one may choose to add a conductive additive and/or a binder material (e.g. binder resin or carbonized resin) to form an electrode (cathode or anode) of structural integrity. The conductive additive or filler may be selected from any electrically conductive material, but is advantageously selected from graphite or carbon particles, carbon black, expanded graphite, graphene, carbon nanotube, carbon nano-fiber, carbon fiber, conductive polymer, or a combination thereof. The amount of conductive fillers is preferably no greater than 30% by weight based on the total cathode electrode weight (without counting the cathode current collector weight), preferably no greater than 15% by weight, and most preferably no greater than 10% by weight. The amount of binder material is preferably no greater than 15% by weight, more preferably no greater than 10%, and most preferably no greater than 5% by weight.

Although there is no limitation on the electrode thickness, the presently invented positive electrode preferably has a thickness greater than 100 µm, more preferably greater than 150 µm, and most preferably greater than 200 µm.

In one preferred embodiment, the meso-porous carbonaceous or graphitic material may be produced by using the following recommended procedures:

(a) dispersing or immersing a graphitic or carbonaceous material (e.g., powder of natural graphite, artificial graphite, meso-phase carbon, meso-carbon micro bead (MCMB), soft carbon, hard carbon, coke, polymeric carbon (carbonized resin), activated carbon (AC), carbon black (CB), multi-walled carbon nanotube (MW-CNT), carbon nano-fiber (CNF), carbon or graphite fiber, meso-phase pitch fiber, and the like) in a mixture of an intercalant and/or an oxidant (e.g., concentrated sulfuric acid and nitric acid) and/or a fluorinating agent to obtain a graphite intercalation compound (GIC), graphite oxide (GO), graphite fluoride (GF), or chemically etched/treated carbon material;

(b) exposing the resulting GIC, GO, GF, or chemically etched/treated carbon material to a thermal shock, preferably in a temperature range of 600-1,100° C. for a short period of time (typically 15 to 60 seconds) to obtain exfoliated graphite or graphite worms; and optionally (c) subjecting the resulting graphite worms to air jet milling to obtain expanded graphite (with graphite flakes thicker than 100 nm).

Alternatively, after step (a) above, the resulting GIC, GO, GF, or chemically etched/treated carbon/graphite material is subjected to repeated rinsing/washing to remove excess chemical. The rinsed products are then subjected to a drying procedure to remove water. The dried GO, GF, chemically treated CB, chemically treated AC, chemically treated MWCNT, chemically treated CNF, chemically treated carbon/graphite/pitch fiber can be used as a cathode active material of the presently invented high-capacity Mg-ion cell. These chemically treated carbonaceous or graphitic materials can be further subjected to a heat treatment at a temperature preferably in the range of 150-1,100° C. for the purposes of thermally reducing the oxidized material, thermally exfoliating/expanding the carbonaceous/graphitic material (for increasing inter-planar spacing and changing the bonding environment between two hexagonal carbon planes or graphene planes), and/or creating meso-scaled pores (2-50 nm) to enable the interior structure being accessed by Mg ion-carrying electrolyte. It may be noted that these interior graphene planes can remain stacked and interconnected with one another, but the above-described chemical/thermal treatments facilitate direct access of these interior graphene planes by Mg ion-carrying electrolyte.

The broad array of carbonaceous materials, such as a soft carbon, hard carbon, polymeric carbon (or carbonized resin), meso-phase carbon, coke, carbonized pitch, carbon black, activated carbon, or partially graphitized carbon, are commonly referred to as the disordered carbon material. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nano-scaled features (e.g. having meso-scaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable.

Hard carbon refers to a carbonaceous material composed of small graphite crystals wherein these graphite crystals or stacks of graphene planes inside the material are not oriented in a favorable directions (e.g. nearly perpendicular to each other) and, hence, are not conducive to further merging of neighboring graphene planes or further growth of these graphite crystals or graphene stacks (i.e., not graphitizable).

Carbon black (CB) (including acetylene black, AB) and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc). These materials per se (without chemical/thermal treatments as described above) are not good candidate cathode materials for the presently invented high-capacity Mg-ion cells. Hence, preferably, they are subjected to further chemical etching or chemical/thermal exfoliation to form a meso-porous structure having a pore size in the range of 2-50 nm (preferably 2-10 nm). These meso-scaled pores enable the liquid electrolyte to enter the pores and access the graphene planes inside individual particles of these carbonaceous materials.

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to a chemical etching/expanding treatment using a process commonly used to produce activated carbon (e.g., treated in a KOH melt at 900° C. for 1-5 hours). This chemical treatment is intended for making the disordered carbon meso-porous, enabling electrolyte to reach the edges or surfaces of the constituent aromatic rings after a battery cell is made. Such an arrangement enables the lithium ions in the liquid electrolyte to readily attach onto exposed graphene planes or edges without having to undergo significant solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce isolated meso-phase particles or spheres, which can be further carbonized and graphitized.

Preferred electrolyte types include liquid electrolyte, gel electrolyte, polymer electrolyte, solid electrolyte, and ionic liquid electrolyte (preferably containing magnesium salts dissolved therein), or a combination thereof.

It is of paramount significance for us to point out the following facts and observations: In a rechargeable lithium metal cell, the surface films (commonly referred to as SEI films) formed on lithium in polar aprotic electrolyte solutions are usually Li ion-conducting, allowing Li ions to enter or leave during repeated charge/discharge cycles. In stark contrast, the surface films formed on magnesium in the same types of electrolyte solutions are not capable of conducting the bivalent Mg ions. Consequently, during the intended cell discharge, electrochemical dissolution of Mg in most of the commonly used polar aprotic solutions has to occur at relatively high overpotential through a mechanism that involves a breakdown of the surface films. During the subsequent re-charging step, the electrochemical deposition of magnesium on Mg electrodes covered by passivating thin films is practically impossible to accomplish.

After three decades of research and development efforts, battery scientists could only partially address this issue by using a very limited number of electrolyte systems in designing their Mg-ion cells. These include ethereal solutions of Grignard reagents, $Mg(BR_2R'_2)_2$ (R, R'=alkyl or aryl groups), $Mg(AX_{4-n}R_nR'_n)_2$ complexes (A=Al, B, Sb, P, As, Fe, and Ta, X=Cl, Br, and F, R, R'=alkyl or aryl groups, $0<n<4$, $n'+n''=n$), or amido-magnesium halides, Mg ion-conducting molten salts, and Mg-doped polymeric electrolytes. The limited selection of usable electrolyte systems has been the single most critical issue that has impeded the commercialization of Mg-ion cells. By contrast, the last 30 years have witnessed an explosive growth of Li-ion cells that have permeated into just about any device that requires power. The limited selection of suitable electrolytes for Mg cells has been most unfortunate and undesirable for several non-trivial reasons:

(1) As of now, none of these electrolytes, such as ethereal solutions of Grignard reagents, are commercially available. One cannot even buy these electrolytes, not to mention buy them with a reasonable price. This is a serious impediment to the initiation and growth of Mg metal or Mg-ion cell industry that potentially offers a much safer battery than Li metal and Li-ion cells.

(2) These known electrolytes are far from being ideal for any cathode-anode combination of a Mg-ion cell. A battery designer has no reliable guidelines to follow in terms of choosing an electrolyte composition when a new anode or cathode active material is identified. One would not know if a SEI layer would be formed on the surface of this intended new electrode material and, if it does form, whether this layer is conductive to Mg ions or not.

(3) A narrow selection of suitable electrolytes would also severely limit the choice of electrode materials.

Most unexpectedly, the use of the presently disclosed meso-porous carbon/graphite materials as an anode active material overcomes this long-standing, most challenging issue of conventional rechargeable Mg-ion cells. Even for this reason alone, our invention will have a profound and far-reaching effect on the emergence of a vibrant Mg-ion battery industry.

With such an anode active material, the Mg-ion cell can have a cathode active material selected from the group consisting of (A) Chevrel phase $Mo_6S_8$, $MnO_2$, CuS, $Cu_2S$, $Ag_2S$, $CrS_2$, and $VOPO_4$; (B) layered compounds $TiS_2$, $V_2O_5$, $MgVO_3$, $MoS_2$, $MgV_2O_5$, and $MoO_3$; (C) Spinel structured compounds $CuCr_2S_4$, $MgCr_2S_4$, $MgMn_2O_4$, $Mg_{0.67}Ni_{1.33}O_2$, and $Mg_2MnO_4$; (D) NASICON structured compounds including $MgFe_2(PO_4)_3$ and $MgV_2(PO_4)_3$; (E) Olivine structured compounds including $MgMnSiO_4$ and $MgFe_2(PO_4)_2$; (F) Tavorite structured compound $Mg_{0.5}VPO_4F$; (G) pyrophosphates $TiP_2O_7$ and $VP_2O_7$; (H) sulfur; and (I) $FeF_3$, and their combinations.

The following examples serve to illustrate the preferred embodiments of the present invention and should not be construed as limiting the scope of the invention:

EXAMPLE 1

Meso-Porous Soft Carbon

Chemically etched or expanded soft carbon was prepared from heat-treating a liquid crystalline aromatic resin (50/50 mixture of anthracene and pyrene) at 200° C. for 1 hour. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting chemically etched or expanded soft carbon was dried by heating at 60° C. in a vacuum for 24 hours.

EXAMPLE 2

Expanded "Activated Carbon" (E-AC)

Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was then dried in a vacuum oven pre-set at 70° C. for 24 hours. The dried sample was then placed in a tube furnace at 1,050° C. for 2 minutes to obtain expanded AC.

EXAMPLE 3

Chemically Treated Needle Coke

Anisotropic needle coke has a fully developed needle-shape texture of optical anisotropy. Volatile species of the raw coke was estimated to be around 5 wt. %. Activation was carried out using KOH in a reaction apparatus that consisted of a stainless steel tube and a nickel sample holder. KOH activation was carried out at 800° C. for 2 h under Ar flow. The coke/KOH ratio was varied between 1/1 and 1/4. Upon cooling, the alkali-rich coke was washed with hot water until the outlet water reached a pH value of 7. The resulting chemically etched or expanded coke was dried by heating at 60° C. in a vacuum for 24 hours.

EXAMPLE 4

Chemically Treated Petroleum Pitch-Derived Hard Carbon

A pitch sample (A-500 from Ashland Chemical Co.) was carbonized in a tube furnace at 900° C. for 2 hours, followed by further carbonization at 1,200° C. for 4 hours. KOH activation was carried out at 800° C. for 2 h under Ar flow to open up the internal structure of pitch-based hard carbon particles.

EXAMPLE 5

Chemically Activated Meso-Phase Carbon and Production of Fluorinated Carbon

Meso-carbon carbon particles (un-graphitized MCMBs) were supplied from China Steel Chemical Co. This material has a density of about 2.2 g/cm³ with a median particle size of about 16 μm. This batch of meso-phase carbon was divided into two samples. One sample was immersed in $K_2CO_3$ at 900° C. for 1 h to form chemically activated meso-carbon. The chemically activated meso-phase carbons showed a BET specific surface area of 1,420 m²/g. This material can be used in both the anode and cathode of a Mg-ion cell due to its high specific surface area and ability to capture and store Mg atoms on its surfaces.

The other sample was subjected to a fluorination treatment. The meso-phase carbon particles were mixed with a PVDF binder in a NMP solution and coated onto an Al foil to form an electrode sheet. This electrode sheet was used as a working electrode in an electrochemical fluorination treatment apparatus consisting of a PTFE beaker, a Pt plate counter electrode, a Pd wire as a reference electrode, and $(C_2H_5)_3$N-3HF as electrolyte. The fluorination procedure was carried out at room temperature by potential sweeping from −1.0 V to 1.0 V at a 20 mV/s scan rate. X-ray diffraction data indicate that the inter-graphene spacing has been increased from 0.337 nm to 0.723 nm.

EXAMPLE 6

Graphitic Fibrils from Pitch-Based Carbon Fibers

Fifty grams of graphite fibers from Amoco (P-55S) were intercalated with a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. The sample was then submitted to a mechanical shearing treatment in a Cowles (a rotating-blade dissolver/disperser) for 10 minutes. The resulting graphitic fibrils were examined using SEM and TEM and their length and diameter were measured.

EXAMPLE 7

Expanded Multi-Walled Carbon Nanotubes (MWCNTs)

Fifty grams of MWCNTs were chemically treated (intercalated and/or oxidized) with a mixture of sulfuric acid, nitric acid, and potassium permanganate at a weight ratio of 4:1:0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds.

EXAMPLE 8

Graphene Oxide from Sulfuric Acid Intercalation and Exfoliation of MCMBs

Meso-carbon micro beads (MCMBs), after graphitization, were supplied from China Steel Chemical Co. This material has a density of about 2.24 g/cm³ with a median particle size of about 16 μm. MCMB (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours.

Part of the dried powder sample was placed in a quartz tube and inserted into a horizontal tube furnace pre-set at a desired temperature, 800° C. for 30 seconds to obtain a graphene material. A small quantity of each sample was mixed with water and ultrasonicated at 60-W power for 10 minutes to obtain a suspension. A small amount was sampled out, dried, and investigated with TEM, which indicated that most of the NGPs were between 1 and 10 layers. The graphene-water suspension was used for subsequent preparation of a graphene cathode.

The remaining dried sample was essentially artificial graphite oxide having an expanded inter-graphene spacing of 0.62 nm. This oxidized graphite was used as an anode active material in one of the presently invented Mg-ion cell.

EXAMPLE 9

Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes.

EXAMPLE 10

Direct Ultrasonication of Natural Graphite to Produce Pristine Graphene

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours.

EXAMPLE 11

Preparation of Electrolytes

The preparation procedure for electrolyte solution of 0.25 mol/L Mg(AlCl$_2$EtBu)$_2$/THF is described briefly as follows: Proper amounts of MgBu$_2$ solution (1M in hexane) and AlEtCl$_2$ solution (1 M in heptane) in the ratio of 1:2 were mixed at room temperature, and a white solid precipitation was formed immediately. After stirring for 48 h, the hexane and heptane were completely evaporated, and a proper amount of high purity tetrahydrofuran (THF, distilled with benzophenone containing sodium chips under argon protection) was added to form the desired 0.25 mol/L solution. All chemical preparations were carried out in an argon-filled glovebox.

Other electrolytes used in the present study include MgCl$_2$/AlCl$_3$/1-ethyl-methyl-imidazolium chloride (EMIC), 1 mol/L Mg(ClO$_4$)$_2$ solution in tetrahydrofuran (THF), and 0.1 mol/L Mg(ClO$_4$)$_2$/PC. It may be noted that these three electrolytes (and most of other electrolytes being considered for use in Mg-ion cells) have been known to form a thick and rigid passivating layer on Mg film that is not Mg ion conductive, preventing Mg dissolution during the cell discharge. Since the passivating layer is electronically insulating, it is also difficult for the re-deposition of Mg to occur during the cell re-charging step. We have surprisingly observed that this long-standing, very challenging issue can be overcome by pre-depositing Mg atoms on the massive surfaces of graphene sheets or other meso-porous graphitic materials herein disclosed. Instead of using a Mg foil directly attached to a current collector at the anode, we chose to deposit a layer of Mg atoms on graphene sheets (e.g. using sputtering or electrochemical deposition) prior to implementing this Mg-loaded graphene layer in contact with an anode current collector. This strategy has unexpectedly eliminated the Mg non-dissolution and non-deposition problems since there appears to be no significant surface passivating layer existing on graphene surfaces.

EXAMPLE 12

Preparation of Control Cathode Active Materials (MgCo$_2$O$_4$ and Mg$_{0.67}$Ni$_{1.33}$O$_2$)

As a baseline cathode active material, MgCo$_2$O$_4$ and Mg$_{0.67}$Ni$_{1.33}$O$_2$ samples were synthesized by the inverse co-precipitation method. First, by using Mg(NO$_3$)$_2$-6H$_2$O and Co(NO$_3$)$_2$-6H$_2$O or Ni(NO$_3$)$_2$-6H$_2$O used as starting materials, we prepared the mixed nitrate solution with concentrations of 0.08 mol/L Mg(NO$_3$)$_2$ and 0.16 mol/L Co(NO$_3$)$_2$ or Ni(NO$_3$)$_2$ in deionized water. Sodium carbonate solution of 0.35 mol/L in water was used as the precipitating agent. The solution of mixed nitrates was poured slowly into the sodium carbonate solution at a temperature of 70-80° C. With continued stirring, co-precipitation proceeded at an almost constant pH. The resulting precipitates were filtered, then washed with hot water until nitrate ions disappeared, and subsequently dried at 80° C. The thus obtained precursor was heated at 350° C. for 2 h in air to fully oxidize. The crystal structures of the MgCo$_2$O$_4$ and Mg$_{0.67}$Ni$_{1.33}$O$_2$ samples were confirmed by X-ray diffraction (XRD) with Mo—K$\alpha$ radiation.

EXAMPLE 13

Preparation of Control Cathode Active Materials (Magnesium Manganese Silicate, Mg$_{1.03}$Mn$_{0.97}$SiO$_4$)

Reagent-grade KCl (melting point=780° C.) was used as flux after drying for 3 h at 150° C. under vacuum. The starting materials were magnesium oxide (MgO), manganese (II) carbonate (MnCO$_3$) and silicon dioxide (SiO$_2$, 15-20 nm) powder. The stoichiometric amounts for the precursor compounds were controlled with the molar ratio of 1.03:0.97:1 for Mg:Mn:Si. The mixture (flux/reactants molar ratio=4) was hand-ground in a mortar by pestle for a 10 minutes, and then poured into a corundum crucible. Then, the powder mixture was dried at 120° C. for 5 h in a vacuum to minimize the water content in the mixture. Subsequently, the mixture was immediately transferred to a tube furnace and heated in a reductive atmosphere (Ar+5 wt % H2) at 350° C. for 2 h to remove carbonate groups. This was followed by final firing at various temperatures at a rate of 2° C./min for 6 h, then cooling to room temperature naturally. Finally, the product was washed three times with deionized water to dissolve any remaining salt, separated by centrifugation, and dried under vacuum at 100° C. for 2 h.

EXAMPLE 14

Preparation of Electrodes and Mg-Ion Cells

The electrodes (either the anode or cathode) were typically prepared by mixing 85 wt % of an electrode active material (e.g. re-constituted graphene particles, 7 wt % acetylene black (Super-P), and 8 wt % polyvinylidene fluoride binder (PVDF, 5 wt % solid content dissolved in N-methyl-2-pyrrolidinoe (NMP)) to form a slurry-like mixture. After coating the slurry on an intended current collector (e.g., Cu foil, Cu foam, or stainless steel foil for the anode, or Al foil, graphene paper, or CNT paper for the cathode), the resulting electrode was dried at 120° C. in vacuum for 2 h to remove the solvent before pressing.

The pre-magnesiation procedure involves either inserting magnesium atoms or ions into the bulk of an anode active material (e.g. graphite fluoride with an expanded inter-graphene spacing) or depositing magnesium onto the surfaces of graphene sheets through electrochemical plating, sputtering, physical deposition, or chemical vapor deposition, etc). For instance, a piece of reduced graphene oxide (RGO) electrode was immersed in the electrolyte solution of 0.25 mol/L Mg(AlCl$_2$EtBu)$_2$/THF prepared in Example 11. A piece of magnesium foil was used as a counter-electrode, which was also immersed in the electrolyte. Direct current was used to charge the RGO electrode until an amount of magnesium equivalent to approximately 1,000-1,500 mAh/g based on RGO weight was electrochemically deposited onto surfaces of RGO sheets. A similar procedure was employed to intercalate magnesium into the bulk of graphite fluoride (GO) particles. The pre-magnesiation procedure was performed in an argon-filled glove-box.

Subsequently, the magnesiated or non-magnesiated electrodes were separately cut into disks (diameter=12 mm) for use as an anode. In the cell containing a non-magnesiated anode, a thin sheet of magnesium foil (as a magnesium source) was attached to the anode surface and a piece of porous separator (e.g., Celgard 2400 membrane) was, in turn, stacked on top of the magnesium foil. A piece of meso-porous carbon or graphitic material coated on a cathode current collector (e.g, Al foil) was used as a cathode and stacked over the separator layer to form a CR2032 coin-type cell. The cell assembly was performed in an argon-filled glove-box. The CV measurements were carried out using a CHI-6 electrochemical workstation at a scanning rate of 1 mV/s. The electrochemical performance of the cells was also evaluated by galvanostatic charge/discharge cycling at a current density of from 50 mA/g to 10 A/g (up to 100 A/g for some cells), using an Arbin and/or a LAND electrochemical workstation.

EXAMPLE 15

Performance of 27 Mg-Ion Cells as Examples

Shown in Table 1 are some examples of the Mg-ion cells herein investigated and their main components. Subsequent tables show the cathode specific capacity, cell-level specific energy, and specific power of these cells.

TABLE 1

Examples of Mg-ion Cells.

| Mg Cell No. | Anode current collector | Anode active material | Mg ion source | Electrolyte | Cathode active material | Cathode current collector |
|---|---|---|---|---|---|---|
| Mg-1 | Stainless steel (SS) | None | Mg foil | $Mg(AlCl_2EtBu)_2$/THF | Graphene, 3-13 nm, meso-porous | Al foil |
| Mg-2 | SS | None | Mg foil | $Mg(AlCl_2EtBu)_2$/THF | Functionalized Graphene | Al foil |
| Mg-3 | SS | None | Mg foil | $Mg(AlCl_2EtBu)_2$/THF | Graphene, nano-structured, <2 nm | Al foil |
| Mg-4 | Cu foil | Graphene, 3-9 nm | Mg foil | $Mg(ClO_4)_2$/THF | Graphene, 3-9 nm | Al foil |
| Mg-5 | Cu foil | Graphene, 3-9 nm | Mg foil | $Mg(ClO_4)_2$/THF | $MgCo_2O_4$ | Al foil |
| Mg-6 | Cu foil | none | Mg foil | $Mg(ClO_4)_2$/THF | $MgCo_2O_4$ | Al foil |
| Mg-7 | Cu foam | Graphene, sputtered Mg | None | EMIC | Graphene, 11-22 nm | Al foil |
| Mg-8 | Cu foil | RGO | Mg foil | EMIC | RGO | Al foam |
| Mg-9 | Cu foil | RGO | Mg foil | EMIC | Graphite fluoride (GF) particles | Al foam |
| Mg-10 | Cu foil | RGO | Mg foil | EMIC | Exfoliated GF | Al foam |
| Mg-11 | SS | GF particles | Mg foil | $Mg(ClO_4)_2$/THF | RGO | Al foil |
| Mg-12 | SS | Exfoliated GF | Mg foil | $Mg(ClO_4)_2$/THF | RGO | Al foil |
| Mg-13 | SS | none | Mg foil | $Mg(ClO_4)_2$/THF | RGO | Al foil |
| Mg-14 | SS | Pre-magnesiated GF particles | None | $Mg(AlCl_2EtBu)_2$/THF | RGO | CNT paper |
| Mg-15 | SS | Pre-mag. GF particles | None | $Mg(AlCl_2EtBu)_2$/THF | Graphite worms | CNT paper |
| Mg-15A | SS | Pre-mag. GF sheets | None | $Mg(AlCl_2EtBu)_2$/THF | Graphite worms | CNT paper |
| Mg-16 | SS | none | Mg foil | $Mg(AlCl_2EtBu)_2$/THF | MWCNT | Al foil |
| Mg-17 | SS | none | Mg foil | $Mg(AlCl_2EtBu)_2$/THF | Expanded MWCNT | Al foil |
| Mg-18 | SS | none | Mg foil | $Mg(AlCl_2EtBu)_2$/THF | $Mg_{0.67}Ni_{1.33}O_2$ | Al foil |
| Mg-19 | Cu foam | RGO | Mg foil | $Mg(AlCl_2EtBu)_2$/THF | Expanded soft carbon | Al foil |
| Mg-20 | Cu foam | RGO | Mg foil | $Mg(AlCl_2EtBu)_2$/THF | Soft carbon | Al foil |
| Mg-21 | Cu foam | RGO | Mg foil | $Mg(AlCl_2EtBu)_2$/THF | $Mg_{1.03}Mn_{0.97}SiO_4$ | Al foil |
| Mg-22 | Cu foam | B-doped graphene | Mg foil | $Mg(AlCl_2EtBu)_2$/THF | Expanded hard carbon | Graphene paper |
| Mg-23 | Cu foam | B-doped graphene | Mg foil | $Mg(AlCl_2EtBu)_2$/THF | Hard carbon | Graphene paper |
| Mg-24 | Cu foam | Expanded MWCNT | Mg foil | $Mg(ClO_4)_2$/PC | Fluorinated graphene | Graphene paper |
| Mg-25 | Cu foam | Expanded MWCNT | Mg foil | $Mg(ClO_4)_2$/PC | Expanded AC | Graphene paper |
| Mg-26 | SS | RGO | Mg foil | $Mg(AlCl_2EtBu)_2$/THF | RGO | Al foil |

Summarized in Table 2 is the electrochemical performance of three Mg-ion cells containing different types of graphene cathodes (graphene sheets re-constituted into a meso-porous structure, graphene sheets containing functional groups (—COOH and —OH, etc), and nano-structured graphene electrode having pore sizes mostly <2 nm). The Mg-ion cell with a meso-porous graphene cathode exhibits the highest cathode specific capacity and highest cell-level specific energy. A surprisingly high specific energy of 378 Wh/kg was achieved when a meso-porous graphene structure-based cathode was implemented. This cell-level specific energy value is higher than that of the best Li-ion battery and best Mg-ion cell ever produced. The corresponding Mg-ion cell with a nano-structured graphene cathode only exhibits a maximum cathode specific capacity of 156 mAh/g and cell-level specific energy of 176 Wh/kg, less than half of the cell containing a meso-porous cathode. Such a huge difference is most unexpected. Furthermore, this new approach has solved the low energy density issue of rechargeable batteries, the most frustrating issue in battery industry for 30 years.

TABLE 2

Electrochemical performance of Mg-ion cells containing different types of graphene cathodes (meso-porous, functional, and nano-structured).

| Mg Cell No. | Anode active material | Mg ion source | Electrolyte | Cathode active material | Max. cathode capacity mAh/g | Max. cell spec. energy, Wh/kg | Max. cell spec. power, W/kg |
|---|---|---|---|---|---|---|---|
| Mg-1 | None | Mg foil | $Mg(AlCl_2EtBu)_2$/THF | Graphene, 3-13 nm, meso-porous | 392 | 378 | — |
| Mg-2 | None | Mg foil | $Mg(AlCl_2EtBu)_2$/THF | Functionalized Graphene | 265 | 287 | — |
| Mg-3 | None | Mg foil | $Mg(AlCl_2EtBu)_2$ / THF | Graphene, nano-structured, <2 nm | 156 | 176 | — |

Although the electrolyte, $Mg(AlCl_2EtBu)_2$/THF, used in the three Mg cells of Table 2 is known to be suitable for rechargeable magnesium cells, the two electrolytes in Table 3 are not. Both $Mg(ClO_4)_2$/THF and EMIC ($MgCl_2$/$AlCl_3$/1-ethyl-methyl-imidazolium chloride) are known to produce a thick and Mg ion-impermeable layer (passivating layer) on the surface of Mg foil or Mg particles used as the anode active material. This layer prevents the dissolution of Mg during the cell discharge due to the Mg ions' inability to diffuse through the layer. This layer, being electrically insulating, also makes it difficult or even impossible for Mg to re-deposit thereon during the cell charging step. This issue is also observed with Mg cell No. 6 in Table 3 below, which shows a thick and dense inactive layer on Mg foil surface, resulting in a low cathode specific capacity (<23 mAh/g) and low cell-level specific energy (26 Wh/kg).

In contrast, by implementing a meso-porous anode active material (e.g. re-constituted from graphene sheets or reduced graphene oxide sheets, RGO), we observed a dramatically higher specific capacity and higher specific energy (e.g. Cell No. 5 vs. Cell No. 6). A close scrutiny of the post-testing cell did not turn out any observable dense passivating layer at the anode. This was a totally un-expected result and the reason for this lack of any observable passivating layer remains unknown.

When the cell was made, a thin Mg foil of a desired mass was pressed against a meso-porous graphene electrode layer, creating a situation where the Mg foil and the graphene layer were essentially "short-circuited," enabling migration of Mg from the Mg foil to the massive graphene surfaces in the presence of a suitable electrolyte (e.g. $Mg(AlCl_2EtBu)_2$/THF). It seems that strong interactions between graphene and Mg have significantly reduced the tendency for Mg to react with the electrolyte, reducing or eliminating the driving force for the formation of a passivating layer.

The ability of a meso-porous carbon or graphitic material implemented at the anode to reduce or eliminate the formation of a dense and thick passivating layer has overcome the longstanding, most difficult problem of the rechargeable magnesium battery. This problem has plagued the development and commercialization of the rechargeable Mg battery for 20+ years even though this type of battery is perceived to be much safer than the Li battery and presumably can have a higher energy density as well. This approach has unexpectedly solved this problem and has dramatically expanded the scope of the electrolytes that can be used for a rechargeable Mg battery. This is applicable to a wide variety of electrolytes, not just those listed in Table 1.

Figure 8:
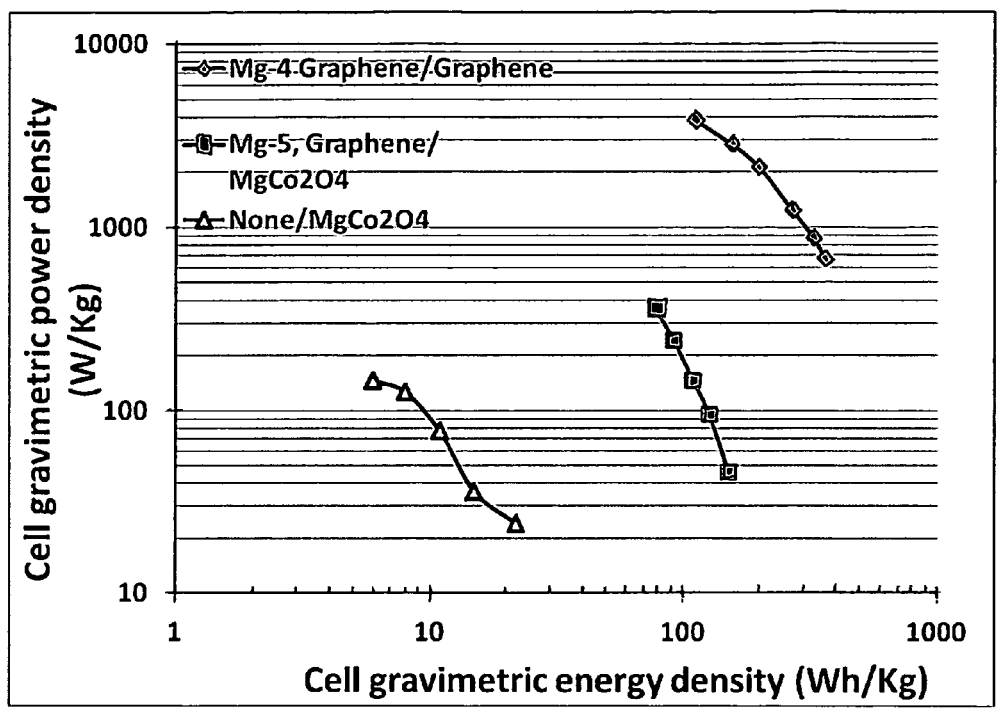
FIG. 8 The Ragone plots (specific power vs. specific energy) of Cell No. Mg-4, Mg-5, and Mg-6.

The Ragone plots (specific power vs. specific energy) of Cell No. Mg-4, Mg-5, and Mg-6 are shown in FIG. 8, which indicates that the power density of the Mg cell with a graphene anode and graphene cathode is an order of magnitude higher than that of the Mg cell with a $MgCo_2O_4$ cathode. The maximum power density of 3,830 W/kg is comparable to that of a symmetric supercapacitor that is known for its high power density. This implies that the presently invented rechargeable Mg-ion cells can be charged and recharged at an exceptional rate. This is a highly desirable feature for a battery intended for use in an EV, power tool, and consumer electronic device. It may be further noted that no previously known Li-ion or Mg battery has reached such a high power density, along with such a high energy density (up to an unprecedented 328 Wh/kg).

Both Cell No. Mg-8 and Mg-10 exhibit a cell-level energy density of >600 Wh/kg that is three times higher than some of the best Li-ion cells. This could not have been anticipated based on any prior art teaching or combined teachings.

The cathode used in Cell No. Mg-9 is graphite fluoride (GF) particles that have an inter-graphene spacing of 0.63 nm, capable of storing Mg to an amount equivalent to 523 mAh/g. However, this same GF, if thermally exfoliated and separated to form fluorinated graphene sheets, is capable of storing Mg to an amount equivalent to 662 mAh/g (Cell No. Mg-10). Also quite significantly, the power density is increased from 672 W/kg of Cell Mg-9 to 4,356 W/kg of Cell Mg-10. This implies that the meso-porous structure of re-constituted GF sheets is fully accessible to Mg ion-carrying liquid electrolyte. The Mg ions are ready to attach themselves to the massive surfaces of GF sheets, completely obviating the need to undergo the otherwise very slow solid-state diffusion. In contrast, Mg ions must diffuse into the inter-graphene spaces in the interior of un-exfoliated GF particles as in Cell Mg-9, resulting in a significantly lower power density.

TABLE 3

Electrochemical performance of Mg-ion cells containing different types of anodes, cathodes, and electrolytes.

| Mg Cell No. | Anode active material | Mg ion source | Electrolyte | Cathode active material | Max. cathode capacity | Max. cell spec. energy | Max. cell spec. power |
|---|---|---|---|---|---|---|---|
| Mg-4 | Graphene, 3-9 nm | Mg foil | $Mg(ClO_4)_2$/THF | Graphene, 3-9 nm | 384 | 363 | 3,830 |
| Mg-5 | Graphene, 3-9 nm | Mg foil | $Mg(ClO_4)_2$/THF | $MgCo_2O_4$ | 167 | 182 | 354 |
| Mg-6 | None | Mg foil | $Mg(ClO_4)_2$/THF | $MgCo_2O_4$ | 23 | 26 | 146 |
| Mg-7 | Graphene + sputtered Mg | None | EMIC | Graphene, 11-22 nm | 327 | 334 | — |
| Mg-8 | RGO | Mg foil | EMIC | RGO | 677 | 622 | 5,342 |
| Mg-9 | RGO | Mg foil | EMIC | Graphite fluoride (GF) particles | 523 | 467 | 672 |
| Mg-10 | RGO | Mg foil | EMIC | Exfoliated GF sheets | 662 | 605 | 4,356 |

Likewise, a comparison of Cell Mg-11, Mg-12, and Mg-13 (Table 4 below) indicates that $Mg(ClO_4)_2$/THF induces a dense passivating layer on Mg foil surface (through SEM examination), preventing effective Mg dissolution and re-deposition during the cell discharge and charge, and this issue can be effectively addressed by implementing a meso-porous structure formed by re-constituted GF sheets or un-exfoliated GF particles at the anode. Cell Mg-12, having an anode of exfoliated GF sheets and a cathode of reduced graphene oxide (RGO) sheets, exhibits a maximum energy density and power density as high as 635 Wh/kg and 6,723 W/kg, respectively. As a point of reference, the typical power density of symmetric supercapacitors (noted for their superior power density) is 3-6 kW/kg; but their energy density is typically in the range of 5-8 Wh/kg. The maximum power density of Li-ion cells is typically in the range of 0.5-1 kW/kg. The presently invented Mg-ion cells have achieved both high energy density and high power density that cannot be achieved with current supercapacitors, lithium-ion batteries, magnesium batteries, Li-air batteries, and Li-sulfur batteries.

Data for Cells Mg-15 and Mg-15A indicate that graphite worms are also an outstanding cathode active material for the Mg-ion cells. The data summarized in Table 4 for Cells Mg-16 and Mg-17 have demonstrated that multi-walled carbon nanotubes (MWCNT) with an expanded inter-graphene layer spacing is much more capable of storing Mg compared with the un-expanded MWCNT and a conventional cathode active material, $Mg_{0.67}Ni_{1.33}O_2$.

TABLE 4

Electrochemical performance of Mg-ion cells containing different types of anodes, cathodes, and electrolytes.

| Mg Cell No. | Anode active material | Mg ion source | Electrolyte | Cathode active material | Max. cathode capacity | Max. cell spec. energy | Max. cell spec. power |
|---|---|---|---|---|---|---|---|
| Mg-11 | GF particles | Mg foil | $Mg(ClO_4)_2$/THF | RGO | 873 | 280 | 1,225 |
| Mg-12 | Exfoliated GF sheets | Mg foil | $Mg(ClO_4)_2$/THF | RGO | 920 | 635 | 6,723 |
| Mg-13 | none | Mg foil | $Mg(ClO_4)_2$/THF | RGO | 67 | 72 | 124 |
| Mg-14 | Pre-magnesiated GF particles | None | $Mg(AlCl_2EtBu)_2$/THF | RGO | 950 | 293 | — |
| Mg-15 | Pre-magnesiated GF particles | None | $Mg(AlCl_2EtBu)_2$/THF | Graphite worms | 645 | 262 | — |
| Mg-15A | Pre-magnesiated GF sheets | None | $Mg(AlCl_2EtBu)_2$/THF | Graphite worms | 645 | 534 | — |
| Mg-16 | none | Mg foil | $Mg(AlCl_2EtBu)_2$/THF | MWCNT | 136 | 169 | — |
| Mg-17 | none | Mg foil | $Mg(AlCl_2EtBu)_2$/THF | Expanded MWCNT | 677 | 523 | — |
| Mg-18 | none | Mg foil | $Mg(AlCl_2EtBu)_2$/THF | $Mg_{0.67}Ni_{1.33}O_2$ | 132 | 166 | — |

The data summarized in Table 5 for Cells Mg-19 and Mg-20 have demonstrated that chemically expanded soft carbon with an expanded inter-graphene layer spacing is much more capable of storing Mg compared with the un-expanded soft carbon, which is in turn more capable than a conventional cathode active material, $Mg_{1.03}Mn_{0.97}SiO_4$ (Cell Mg-21). Similarly, chemically expanded hard carbon with an expanded inter-graphene layer spacing (Cell Mg-22) is much more capable of storing Mg compared with the un-expanded hard carbon (Mg-23).

This is absolutely a revolution in the art of rechargeable batteries in general and the art of magnesium batteries in particular.

TABLE 5

Electrochemical performance of Mg-ion cells containing different types of anodes, cathodes, and electrolytes.

| Mg Cell No. | Anode active material | Mg ion source | Electrolyte | Cathode active material | Max. cathode capacity | Max. cell spec. energy | Max. cell spec. power |
|---|---|---|---|---|---|---|---|
| Mg-19 | RGO | Mg foil | $Mg(AlCl_2EtBu)_2$/THF | Expanded soft carbon | 692 | 538 | — |
| Mg-20 | RGO | Mg foil | $Mg(AlCl_2EtBu)_2$/THF | Soft carbon | 236 | 276 | — |
| Mg-21 | RGO | Mg foil | $Mg(AlCl_2EtBu)_2$/THF | $Mg_{1.03}Mn_{0.97}SiO_4$ | 210 | 245 | — |
| Mg-22 | B-doped graphene | Mg foil | $Mg(AlCl_2EtBu)_2$/THF | Expanded hard carbon | 598 | 503 | — |
| Mg-23 | B-doped graphene | Mg foil | $Mg(AlCl_2EtBu)_2$/THF | Hard carbon | 221 | 262 | — |
| Mg-24 | Expanded MWCNT | Mg foil | $Mg(ClO_4)_2$/PC | Fluorinated graphene sheets | 456 | 232 | — |
| Mg-25 | Expanded MWCNT | Mg foil | $Mg(ClO_4)_2$/PC | Expanded AC | 418 | 219 | — |
| Mg-26 | RGO | Mg foil | $Mg(AlCl_2EtBu)_2$/THF | RGO | 896 | 633 | — |

In summary, after extensive and in-depth studies, we have developed a new magnesium-ion battery technology based on new electrochemistry:

(1) We have discovered that a broad array of chemically treated or expanded carbonaceous or graphitic materials prepared in a meso-porous structure, can be used as a cathode active material of a magnesium-ion cell. All of these cathode active materials are also found to be excellent anode active materials. It has been commonly and generally accepted that if a material can be used as an anode active material of a cell, the same material cannot be used as a cathode active material of the same cell. In particular, there has been no reported example of using a cathode active material of a magnesium-ion cell as an anode active material of the same cell. We have defied this expectation of all artisans in the field of electrochemistry or battery industry.

(2) We have further observed that the meso-porous carbonaceous or graphitic material cathode in a magnesium-ion cell as herein specified can exhibit a specific capacity significantly higher than 300 mAh/g and, in several samples, the capacity has exceeded 800 mAh/g. This has been most surprising and has not been reported or predicted by those who work in the battery industry or the field of electrochemistry.

(3) Surprisingly, the implementation of graphene or a meso-porous carbon or graphite material as an anode active material has effectively reduced or eliminated the formation of a dense passivating layer on Mg foil. The formation of such a passivating layer, which is impermeable to Mg ions, is a fundamental barrier that has impeded the use of most of the presumably outstanding electrolytes. The presently invented approach has overcome this long-standing problem of the battery industry.

(4) The implementation of a meso-porous carbon or graphite cathode in a Mg-ion cell has led to an unprecedentedly high energy density, greater than 300-650 Wh/kg (based on total cell weight) in several cases.

We claim:

1. A magnesium-ion cell comprising:
   (a) a positive electrode or cathode comprising a cathode active material which consists of a carbon or graphitic material, wherein said cathode forms a meso-porous structure having a pore size in the range from 2 nm to 50 nm in direct contact with an electrolyte;
   (b) a negative electrode or anode comprising an anode active material selected from a halogenated or oxidized carbon or graphitic material, having an inter-graphene spacing no less than 0.4 nm or $d_{002} \geq 0.4$ nm as determined by X-ray diffraction, which is selected from graphite fluoride, halogen-treated graphite, oxidized meso-carbon micro beads or MCMBs, fluorinated MCMBs, halogen-treated MCMBs, oxidized soft carbon or hard carbon, fluorinated soft carbon or hard carbon, halogen-treated hard carbon or soft carbon, oxidized coke, fluorinated coke, halogen-treated coke, oxidized carbon nanotube, fluorinated carbon nanotube, halogen-treated carbon nanotube, a combination thereof, or a pre-magnesiated version thereof which is pre-intercalated or pre-loaded with magnesium ions before said cell is made;
   (c) a porous separator disposed between the anode and the cathode; and
   (d) a magnesium-containing electrolyte in ionic contact with the anode and the cathode.

2. A magnesium-ion cell comprising (a) a positive electrode or cathode comprising a cathode active material which consists of an expanded carbon or an expanded graphitic material having a surface area to capture and store magnesium thereon, wherein said cathode forms a porous structure having a specific surface area greater than 100 $m^2/g$ that is in physical contact with an electrolyte, wherein said expanded carbon or expanded graphitic material has an expanded inter-graphene spacing no less than 0.4 nm and is selected from graphite fluoride, halogen-treated graphite, oxidized meso-carbon micro beads or MCMBs, fluorinated MCMBs, halogen-treated MCMBs, oxidized soft carbon or hard carbon, fluorinated soft carbon or hard carbon, halogen-treated hard carbon or soft carbon, oxidized coke, fluorinated coke, halogen-treated coke, oxidized carbon nanotube, fluorinated carbon nanotube, halogen-treated carbon nanotube, or a combination thereof; (b) a negative electrode or anode comprising a pre-magnesiated anode active material or a combination of a magnesium ion source and an anode active material; (c) a porous separator disposed between the anode and the cathode; and (d) a magnesium-containing electrolyte in ionic contact with the anode and the cathode; wherein the cell has an open circuit voltage or OCV from 0.3 volts to 3.5 volts when the cell is made and the cell is then electrochemically formed by operating the cell from said OCV to a lower voltage limit or LVL lower than said OCV or to a upper voltage limit or UVL higher than said OCV after the cell is made, wherein said LVL is no lower than 0.1 volts and said UVL is no higher than 4.0 volts.

3. The magnesium-ion cell of claim 1, wherein said carbon or graphitic material in the cathode is selected from graphite worms, exfoliated graphite flakes, expanded graphite, chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-graphene planar separation no less than 0.4 nm, chemically expanded carbon nano-fiber, or a combination thereof.

4. The magnesium-ion cell of claim 1, wherein said carbon or graphitic material in the cathode contains a single-layer sheet or multi-layer platelet of graphene, graphene oxide, graphene fluoride, hydrogenated graphene, nitrogenated graphene, pristine graphene, doped graphene, boron doped graphene, nitrogen doped graphene, chemically treated graphene, reduced graphene oxide, functionalized graphene or graphene oxide, or a combination thereof.

5. The magnesium-ion cell of claim 1, wherein said carbon or graphitic material in the cathode contains a single-wall carbon nanotube or multi-wall carbon nanotube that is subjected to at least one treatment selected from doping, ion implementation, chemical etching, fluorinating treatment, halogen treatment, heavy oxidation, or chemical treatment to generate defects to a cylindrical graphene layer of a nanotube or to increase the spacing between two cylindrical graphene planes from an original spacing of approximately 0.34 nm to an expanded spacing of greater than 0.4 nm.

6. The magnesium-ion cell of claim 5, wherein said expanded spacing is greater than 0.5 nm.

7. The magnesium-ion cell of claim 1 wherein said cathode has a specific surface area greater than 100 $m^2/g$.

8. The magnesium-ion cell of claim 1 wherein said cathode has a specific surface area greater than 500 $m^2/g$.

9. The magnesium-ion cell of claim 1 wherein said cathode has a specific surface area greater than 1,000 $m^2/g$.

10. The magnesium-ion cell of claim 1, wherein said cathode active material has a specific capacity greater than 600 mAh/g.

11. The magnesium-ion cell of claim 1 wherein said cathode further contains a conductive filler selected from graphite or carbon particles, carbon black, expanded graphite particles, carbon nanotube, carbon nano-fiber, carbon fiber, conductive polymer, or a combination thereof.

12. The magnesium-ion cell of claim 1, further comprising a cathode current collector and an anode current collector wherein said cathode current collector or anode current collector is a porous, electrically conductive material selected from metal foam, carbon-coated metal foam, metal web or screen, carbon-coated metal web or screen, perforated metal sheet, carbon-coated porous metal sheet, metal fiber mat, carbon-coated metal-fiber mat, metal nanowire mat, porous conductive polymer film, conductive polymer nano-fiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nanotube paper, or a combination thereof.

13. The magnesium-ion cell of claim 1, further comprising a cathode current collector and an anode current collector wherein said cathode current collector or anode current collector is a carbon or graphite-based material selected from a carbon fiber sheet, paper, web, film, woven fabric, non-woven; expanded graphite film, exfoliated graphite paper, flexible graphite sheet, metal-reinforced flexible graphite, resin-impregnated graphite sheet, graphene paper composite, graphene oxide paper composite, reduced graphene oxide paper composite, carbon nano-fiber paper composite, carbon nano-tube paper composite, carbon fiber-reinforced composite, or a combination thereof.

14. The magnesium-ion cell of claim 1, further comprising a cathode current collector and an anode current collector wherein said anode current collector or cathode current collector is selected from a stainless steel, a surface-passivated metal, a coated metal, or a carbon-coated metal.

15. The magnesium-ion cell of claim 1, wherein the electrolyte is organic liquid electrolyte, ionic liquid electrolyte, gel electrolyte, polymer electrolyte, or solid electrolyte containing a first amount of magnesium ions when said cell is made.

16. The magnesium-ion cell of claim 1, wherein said carbon or graphitic material with an inter-graphene spacing no less than 0.4 nm or $d_{002} \geq 0.4$ nm is selected from exfoliated graphite flakes, expanded graphite, chemically treated graphite, chemically etched or expanded soft carbon, chemically etched or expanded hard carbon, exfoliated activated carbon, chemically etched or expanded carbon black, chemically expanded or etched multi-walled carbon nanotube, nitrogen-doped carbon nanotube, boron-doped carbon nanotube, chemically doped carbon nanotube, ion-implanted carbon nanotube, chemically expanded carbon nano-fiber, or a combination thereof.

17. The magnesium-ion cell of claim 1, wherein said anode active material contains a single-layer sheet or multi-layer platelet of graphene, graphene oxide, graphene fluoride, hydrogenated graphene, nitrogenated graphene, pristine graphene, doped graphene, boron doped graphene, nitrogen doped graphene, ion-implanted graphene, chemically treated graphene, reduced graphene oxide, functionalized graphene or graphene oxide, or a combination thereof.

18. The magnesium-ion cell of claim 1, wherein said anode active material contains a single-wall carbon nanotube or multi-wall carbon nanotube.

19. The magnesium-ion cell of claim 2, wherein the magnesium ion source comprises a magnesium chip, magnesium alloy chip, magnesium foil, magnesium alloy foil, magnesium powder, magnesium alloy powder, magnesium particles, magnesium fibers or rods, magnesium or magnesium alloy film coated on a surface of an anode material or current collector, or a combination thereof.

20. The magnesium-ion cell of claim 2, wherein said anode active material is selected from a carbon or graphitic material with an inter-graphene spacing no less than 0.4 nm or $d_{002} \geq 0.4$ nm as determined by X-ray diffraction, or a combination thereof.

21. The magnesium-ion cell of claim 2, wherein said anode active material is selected from graphene sheets, graphite worms, exfoliated graphite flakes, expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded or etched multi-walled carbon nanotube, nitrogen-doped carbon nanotube, boron-doped carbon nanotube, chemically doped carbon nanotube, ion-implanted carbon nanotube, chemically expanded carbon nano-fiber, or a combination thereof.

22. The magnesium-ion cell of claim 2, wherein said anode active material is selected from a single-layer sheet or multi-layer platelet of graphene, graphene oxide, graphene fluoride, hydrogenated graphene, nitrogenated graphene, pristine graphene, doped graphene, boron doped graphene, nitrogen doped graphene, ion-implanted graphene, chemically treated graphene, reduced graphene oxide, functionalized graphene or graphene oxide, or a combination thereof.

23. The magnesium-ion cell of claim 2, wherein said anode active material contains a single-wall carbon nanotube or multi-wall carbon nanotube.

24. The magnesium-ion cell of claim 2, wherein the cell is subsequently charged to a voltage no higher than said UVL and discharged to a voltage no lower than said LVL.

25. The magnesium-ion cell of claim 2, wherein said cathode active material exhibits a specific capacity greater than 300 mAh/g.

26. The magnesium-ion cell of claim 2, wherein said cathode active material exhibits a specific capacity greater than 600 mAh/g.

27. The magnesium-ion cell of claim 2, wherein said cathode active material exhibits a specific capacity greater than 800 mAh/g.

28. A magnesium-ion cell comprising:
(a) a positive electrode or cathode containing a cathode active material that is not a graphitic or carbonaceous material;
(b) a negative electrode or anode comprising a pre-magnesiated anode active material selected from single-layer or multi-layer graphene, graphene oxide, graphene fluoride, hydrogenated graphene, nitrogenated graphene, pristine graphene, doped graphene, boron doped graphene, nitrogen doped graphene, ion-implanted graphene, chemically treated graphene, reduced graphene oxide, functionalized graphene or graphene oxide, graphite worms, activated graphite worms, activated exfoliated graphite flakes, activated expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded or etched multi-walled carbon nanotube, nitrogen-doped carbon nanotube, boron-doped carbon nanotube, chemically doped carbon nanotube, ion-implanted carbon nanotube, chemically expanded carbon nano-fiber, chemically activated graphene, or a combination thereof, which is pre-intercalated or pre-loaded with magnesium ions before said magnesium-ion cell is made;
(c) a porous separator disposed between the anode and the cathode; and
(d) a magnesium-containing electrolyte in ionic contact with the anode and the cathode.

29. The magnesium-ion cell of claim 28, wherein said cathode active material is selected from the group consisting of (A) Chevrel phase $Mo_6S_8$, $MnO_2$, CuS, $Cu_2S$, $Ag_2S$, $CrS_2$, and $VOPO_4$; (B) layered compounds $TiS_2$, $V_2O_5$, $MgVO_3$, $MoS_2$, $MgV_2O_5$, and $MoO_3$; (C) Spinel structured compounds $CuCr_2S_4$, $MgCr_2S_4$, $MgMn_2O_4$, $Mg_{0.67}Ni_{1.33}O_2$, and $Mg_2MnO_4$; (D) NASICON structured compounds including $MgFe_2(PO_4)_3$ and $MgV_2(PO_4)_3$; (E) Olivine structured compounds including $MgMnSiO_4$ and $MgFe_2(PO_4)_2$; (F) Tavorite structured compound $Mg_{0.5}VPO_4F$; (G) pyrophosphates $TiP_2O_7$ and $VP_2O_7$; (H) sulfur; (I) $FeF_3$, and combinations thereof.

* * * * *